(12) United States Patent
Meier et al.

(10) Patent No.: US 7,382,911 B1
(45) Date of Patent: Jun. 3, 2008

(54) IDENTIFICATION CARD READER

(75) Inventors: Timothy P. Meier, Camillus, NY (US); Joseph Sakal, Skaneateles, NY (US); William H. Havens, Marcellus, NY (US); Charles Barber, Fayetteville, NY (US); George S. Smith, II, Manlius, NY (US)

(73) Assignee: Hand Held Products, Inc., Skancateles Falls, NY (US)

( * ) Notice: Subject to any disclaimer, the term of this patent is extended or adjusted under 35 U.S.C. 154(b) by 570 days.

(21) Appl. No.: 09/788,179

(22) Filed: Feb. 16, 2001

(51) Int. Cl.
G06K 9/00 (2006.01)

(52) U.S. Cl. ...................... 382/139; 382/140

(58) Field of Classification Search ........ 382/135–140; 902/24–26; 340/5.6, 5.52, 5.53, 5.54, 5.84, 340/5.83, 5.64
See application file for complete search history.

(56) References Cited

U.S. PATENT DOCUMENTS

| | | |
|---|---|---|
| 2,357,378 A | 9/1944 | Benford |
| 3,596,389 A | 8/1971 | Drueck |
| 3,857,626 A | 12/1974 | Rosenberger et al. |
| 3,954,244 A | 5/1976 | Gopstein |
| 4,017,129 A | 4/1977 | Boldt et al. |
| 4,126,768 A | 11/1978 | Grenzow |
| 4,141,078 A | 2/1979 | Bridges, Jr. et al. |
| 4,210,899 A * | 7/1980 | Swonger et al. ............ 382/125 |
| 4,313,035 A | 1/1982 | Jordan et al. |
| 4,403,700 A | 9/1983 | Manlove |
| 4,432,020 A | 2/1984 | Onose et al. |
| 4,467,358 A * | 8/1984 | Switsen ....................... 348/501 |
| 4,471,165 A | 9/1984 | DeFino et al. |
| 4,524,396 A | 6/1985 | Schulz et al. |
| 4,534,562 A | 8/1985 | Cuff et al. |
| 4,630,201 A | 12/1986 | White |
| 4,658,416 A | 4/1987 | Tanaka |
| 4,680,801 A | 7/1987 | Etherington et al. |
| 4,689,478 A | 8/1987 | Hale et al. |
| 4,689,742 A | 8/1987 | Troy et al. |
| 4,699,531 A | 10/1987 | Ulinski, Sr. et al. |
| 4,705,939 A | 11/1987 | Ulinski, Sr. |

(Continued)

FOREIGN PATENT DOCUMENTS

EP 0791893 A2 8/1997

(Continued)

OTHER PUBLICATIONS

Skan-A-Matic Corp., The EAN/UPC Verifier To Evaluate And Measure EAN and UPC Code Symbols, Specification Information (4 pgs.). Reference published more than one year prior to filing date of present application.

(Continued)

*Primary Examiner*—Brian Le
(74) *Attorney, Agent, or Firm*—Marjama Muldoon Blasiak & Sullivan LLP

(57) ABSTRACT

There is described a method and apparatus for processing a card. A card that is processed can have a corresponding card holder. In one embodiment, a card reader can be provided for reading information of a card. A card reader in one embodiment can be configured to sense a level of degradation of a card. A card reader in one embodiment can be in communication with a remote processor system.

77 Claims, 12 Drawing Sheets

U.S. PATENT DOCUMENTS

| | | |
|---|---|---|
| 4,711,996 A | 12/1987 | Drexler |
| 4,747,050 A | 5/1988 | Brachtl et al. |
| 4,775,784 A | 10/1988 | Stark |
| 4,783,823 A | 11/1988 | Tasaki et al. |
| 4,821,118 A * | 4/1989 | Lafreniere .................. 348/156 |
| 4,839,781 A | 6/1989 | Barnes et al. |
| 4,858,121 A | 8/1989 | Barber et al. |
| 4,860,226 A | 8/1989 | Martin et al. |
| 4,870,503 A | 9/1989 | Miura |
| 4,897,865 A | 1/1990 | Canuel |
| 4,902,079 A | 2/1990 | Kaplan et al. |
| 4,920,567 A | 4/1990 | Malek |
| 4,943,868 A | 7/1990 | Yoshinaga et al. |
| 5,001,612 A | 3/1991 | Odium |
| 5,051,567 A | 9/1991 | Tedesco |
| 5,053,607 A * | 10/1991 | Carlson et al. ................ 705/18 |
| 5,109,426 A | 4/1992 | Parks |
| 5,115,888 A | 5/1992 | Schneider |
| 5,194,720 A | 3/1993 | Reinnagel et al. |
| 5,216,517 A | 6/1993 | Kinoshita et al. |
| 5,218,190 A | 6/1993 | Hardesty et al. |
| 5,227,613 A * | 7/1993 | Takagi et al. ................ 235/380 |
| 5,231,293 A | 7/1993 | Longacre, Jr. |
| 5,258,604 A | 11/1993 | Behrens et al. |
| 5,285,056 A | 2/1994 | Tedesco et al. |
| 5,286,954 A * | 2/1994 | Sato et al. ................... 235/379 |
| 5,297,202 A | 3/1994 | Kapp et al. |
| 5,324,922 A | 6/1994 | Roberts |
| 5,334,821 A | 8/1994 | Campo et al. |
| 5,334,825 A | 8/1994 | Maddox |
| 5,347,589 A | 9/1994 | Meeks et al. |
| 5,353,331 A | 10/1994 | Emery et al. |
| 5,357,563 A | 10/1994 | Hamilton et al. |
| 5,362,053 A | 11/1994 | Miller |
| 5,386,104 A | 1/1995 | Sime |
| 5,406,619 A | 4/1995 | Akhteruzzaman et al. |
| 5,455,861 A | 10/1995 | Faucher et al. |
| 5,467,403 A | 11/1995 | Fishbine et al. |
| 5,474,148 A * | 12/1995 | Takata ........................ 180/206 |
| 5,479,530 A | 12/1995 | Nair et al. |
| 5,504,315 A | 4/1996 | Hardesty et al. |
| 5,509,083 A | 4/1996 | Abtahi et al. |
| 5,521,966 A | 5/1996 | Friedes et al. |
| 5,559,885 A | 9/1996 | Drexler et al. |
| 5,561,282 A | 10/1996 | Price et al. |
| 5,564,841 A | 10/1996 | Austin et al. |
| 5,568,357 A | 10/1996 | Kochis et al. |
| 5,569,899 A | 10/1996 | Tedesco |
| 5,577,118 A | 11/1996 | Sasaki et al. |
| 5,581,607 A | 12/1996 | Richardson, Jr. et al. |
| 5,586,166 A | 12/1996 | Turban |
| 5,625,534 A | 4/1997 | Okaya et al. |
| 5,633,488 A | 5/1997 | Spitz |
| 5,635,012 A * | 6/1997 | Belluci et al. .............. 156/277 |
| 5,638,457 A | 6/1997 | Deaton et al. |
| 5,640,002 A | 6/1997 | Ruppert et al. |
| 5,642,160 A * | 6/1997 | Bennett ....................... 348/156 |
| 5,642,922 A * | 7/1997 | Ramachandran et al. .... 312/7.2 |
| 5,652,806 A | 7/1997 | Friend |
| 5,657,389 A | 8/1997 | Houvener |
| 5,659,431 A | 8/1997 | Ackley |
| 5,672,860 A | 9/1997 | Miller et al. |
| 5,679,943 A | 10/1997 | Schultz et al. |
| 5,703,349 A | 12/1997 | Meyerson et al. |
| 5,714,745 A | 2/1998 | Ju et al. |
| 5,717,195 A | 2/1998 | Feng et al. |
| 5,729,001 A | 3/1998 | Spitz |
| 5,740,232 A | 4/1998 | Pailles et al. |
| 5,745,705 A | 4/1998 | Iguchi |
| 5,780,825 A * | 7/1998 | Sato et al. ................... 235/379 |
| 5,805,807 A | 9/1998 | Hanson et al. |
| 5,818,023 A | 10/1998 | Meyerson et al. |
| 5,837,983 A | 11/1998 | Actis et al. |
| 5,845,256 A | 12/1998 | Pescitelli et al. |
| 5,864,125 A | 1/1999 | Szabo |
| 5,878,124 A | 3/1999 | Griesmer et al. |
| 5,895,902 A | 4/1999 | Ziarno |
| 5,914,474 A | 6/1999 | Spitz |
| 5,923,735 A | 7/1999 | Swartz et al. |
| 5,926,549 A | 7/1999 | Pinkas |
| 5,932,862 A | 8/1999 | Hussey et al. |
| 5,933,812 A | 8/1999 | Meyer et al. |
| 5,939,697 A | 8/1999 | Spitz |
| 5,945,975 A | 8/1999 | Lundrigan et al. |
| 5,949,043 A | 9/1999 | Hayashida |
| 5,949,052 A | 9/1999 | Longacre, Jr. et al. |
| 5,949,378 A | 9/1999 | Coveley |
| 5,959,281 A | 9/1999 | Domiteaux |
| 5,959,282 A | 9/1999 | Tabuchi |
| 5,969,324 A | 10/1999 | Reber |
| 5,970,146 A | 10/1999 | Mccall et al. |
| 5,979,764 A | 11/1999 | Swyst et al. |
| 6,000,615 A | 12/1999 | Spitz |
| 6,000,616 A | 12/1999 | Spitz |
| 6,003,008 A | 12/1999 | Postrel et al. |
| 6,003,762 A | 12/1999 | Hayashida |
| 6,004,003 A | 12/1999 | Dalton et al. |
| 6,016,135 A | 1/2000 | Biss et al. |
| 6,019,286 A | 2/2000 | Li et al. |
| 6,036,091 A | 3/2000 | Spitz |
| 6,064,751 A | 5/2000 | Smithies et al. |
| 6,065,679 A | 5/2000 | Levie et al. |
| 6,068,184 A * | 5/2000 | Barnett ....................... 235/379 |
| 6,073,034 A | 6/2000 | Jacobsen et al. |
| 6,076,731 A * | 6/2000 | Terrell ........................ 235/454 |
| 6,078,848 A | 6/2000 | Bernstein et al. |
| 6,097,606 A | 8/2000 | Groves et al. |
| 6,101,483 A | 8/2000 | Petrovich et al. |
| 6,102,290 A | 8/2000 | Swartz et al. |
| 6,104,809 A * | 8/2000 | Berson et al. .............. 713/186 |
| 6,112,857 A | 9/2000 | Morrison |
| 6,118,860 A * | 9/2000 | Hillson et al. .............. 379/155 |
| 6,118,889 A | 9/2000 | Izuno et al. |
| 6,142,369 A | 11/2000 | Jonstromer |
| 6,149,055 A | 11/2000 | Gatto |
| 6,155,489 A | 12/2000 | Collins, Jr. et al. |
| 6,179,206 B1 | 1/2001 | Matsumori |
| 6,193,152 B1 | 2/2001 | Fernando et al. |
| 6,199,753 B1 | 3/2001 | Tracy et al. |
| 6,212,290 B1 * | 4/2001 | Gagne et al. ................ 382/125 |
| 6,230,970 B1 | 5/2001 | Walsh et al. |
| 6,234,389 B1 | 5/2001 | Valliani et al. |
| 6,243,447 B1 | 6/2001 | Swartz et al. |
| 6,244,764 B1 | 6/2001 | Lei et al. |
| 6,246,995 B1 | 6/2001 | Walter et al. |
| 6,247,645 B1 | 6/2001 | Harris et al. |
| 6,253,998 B1 | 7/2001 | Ziarno |
| 6,257,487 B1 | 7/2001 | Hayashida |
| 6,268,788 B1 | 7/2001 | Gray |
| 6,272,506 B1 | 8/2001 | Bell |
| 6,279,825 B1 | 8/2001 | Yokoyama |
| 6,308,893 B1 | 10/2001 | Waxelbaum et al. |
| 6,311,165 B1 | 10/2001 | Coutts et al. |
| 6,311,896 B1 | 11/2001 | Mulla et al. |
| 6,315,195 B1 * | 11/2001 | Ramachandran ............ 235/380 |
| 6,321,981 B1 | 11/2001 | Ray et al. |
| 6,325,288 B1 | 12/2001 | Spitz |
| 6,328,208 B1 * | 12/2001 | Artino et al. ................ 235/379 |
| 6,330,973 B1 | 12/2001 | Bridgelall et al. |
| 6,336,900 B1 | 1/2002 | Alleckson et al. |
| 6,340,115 B1 | 1/2002 | Swartz |
| 6,354,503 B1 | 3/2002 | Chiu |
| 6,357,662 B1 | 3/2002 | Helton et al. |
| 6,359,603 B1 | 3/2002 | Zwern |

| | | |
|---|---|---|
| 6,400,836 B2 | 6/2002 | Senior |
| 6,415,982 B2 | 7/2002 | Bridgelall et al. |
| 6,424,949 B1 | 7/2002 | Deaton et al. |
| 6,431,444 B1 | 8/2002 | Gatto |
| 6,435,412 B2 | 8/2002 | Tsi et al. |
| 6,439,345 B1 | 8/2002 | Recktenwald et al. |
| 6,460,069 B1 | 10/2002 | Berline et al. |
| 6,471,125 B1 | 10/2002 | Addy |
| 6,474,550 B1 | 11/2002 | Caridas |
| 6,486,862 B1 | 11/2002 | Jacobsen et al. |
| 6,492,978 B1 | 12/2002 | Selig et al. |
| 6,505,778 B1 * | 1/2003 | Reddersen et al. .... 235/462.25 |
| 6,512,840 B1 | 1/2003 | Tognazzini |
| 6,513,715 B2 | 2/2003 | Heske, III |
| 6,532,152 B1 | 3/2003 | White et al. |
| 6,533,175 B1 | 3/2003 | Herzig et al. |
| 6,535,299 B1 | 3/2003 | Scherz |
| 6,536,661 B1 * | 3/2003 | Takami et al. .............. 235/379 |
| 6,539,363 B1 | 3/2003 | Allgeier et al. |
| 6,550,683 B1 | 4/2003 | Augustine |
| 6,554,705 B1 | 4/2003 | Cumbers |
| 6,557,754 B2 | 5/2003 | Gray et al. |
| 6,561,612 B2 | 5/2003 | Minckler |
| 6,572,012 B1 | 6/2003 | Gannon et al. |
| 6,601,045 B1 * | 7/2003 | DePietro et al. .............. 705/43 |
| 6,606,395 B1 | 8/2003 | Rasmussen et al. |
| 6,626,357 B1 * | 9/2003 | Ross .......................... 235/379 |
| 6,657,543 B1 * | 12/2003 | Chung ..................... 340/573.1 |
| 6,700,997 B1 | 3/2004 | Spitz |
| 6,705,531 B1 * | 3/2004 | Norton ....................... 235/492 |
| 6,714,665 B1 * | 3/2004 | Hanna et al. ................ 382/117 |
| 6,718,337 B1 * | 4/2004 | Klein et al. .................. 707/102 |
| 6,739,513 B1 | 5/2004 | McClellan et al. |
| 6,802,449 B2 | 10/2004 | Schuessler |
| 2001/0020640 A1 | 9/2001 | Yokochi |
| 2002/0140714 A1 | 10/2002 | Hoffman |
| 2003/0132292 A1 | 7/2003 | Gomez et al. |
| 2003/0132293 A1 | 7/2003 | Fitch et al. |
| 2003/0132294 A1 | 7/2003 | Gomez et al. |
| 2003/0132297 A1 | 7/2003 | Mccall et al. |
| 2003/0132918 A1 | 7/2003 | Fitch et al. |
| 2003/0135751 A1 | 7/2003 | ODonnell et al. |
| 2003/0229793 A1 | 12/2003 | Mccall et al. |

FOREIGN PATENT DOCUMENTS

WO     WO 99/62018 A1    12/1999

OTHER PUBLICATIONS

Skan-A-Matic Corp., The EAN/UPC Verifier To Evaluate And Measure EAN and UPC Code Symbols, Specification Information (4 pgs.). Reference published more than one year prior to filing date of present application, 2000.

* cited by examiner

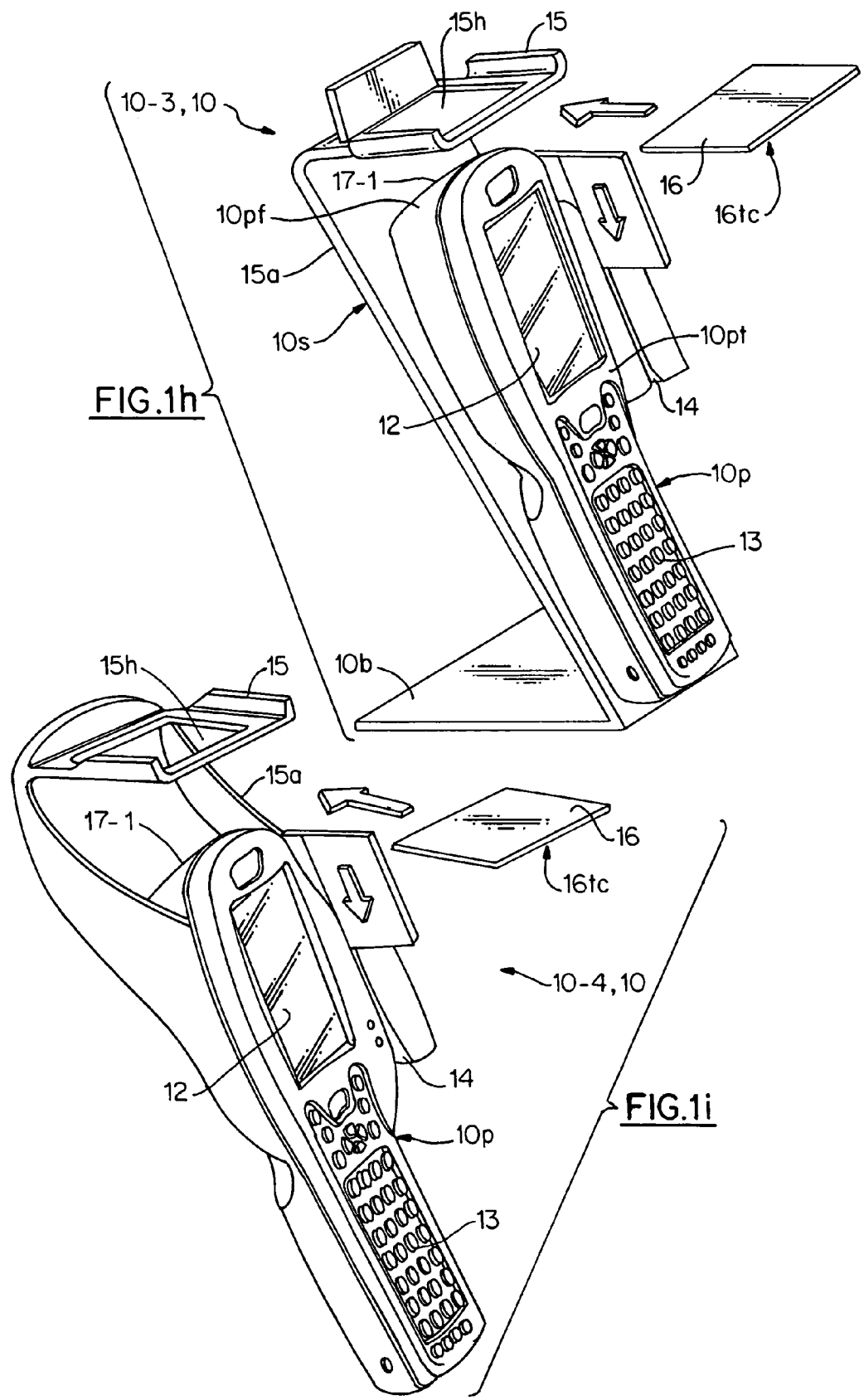

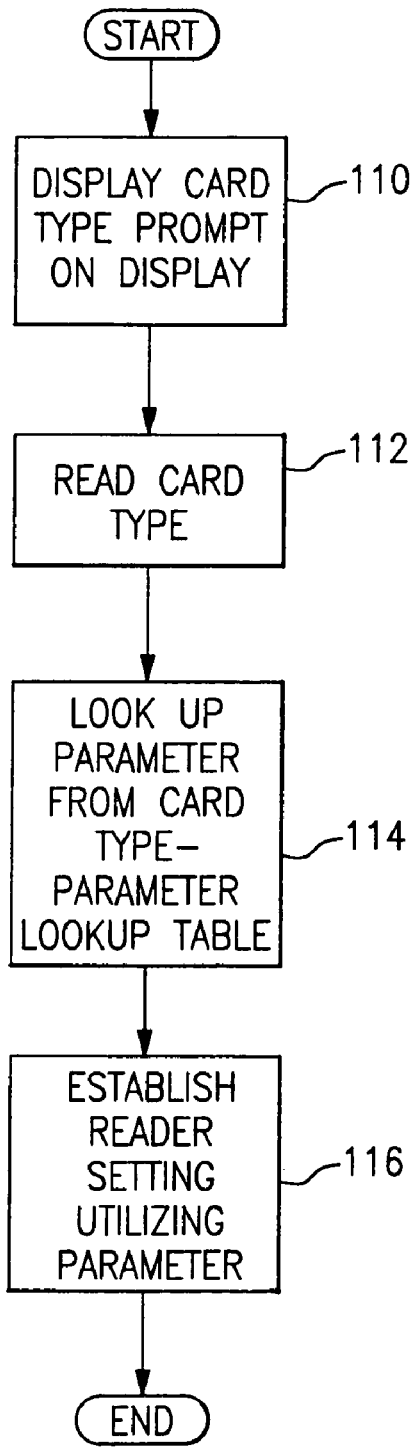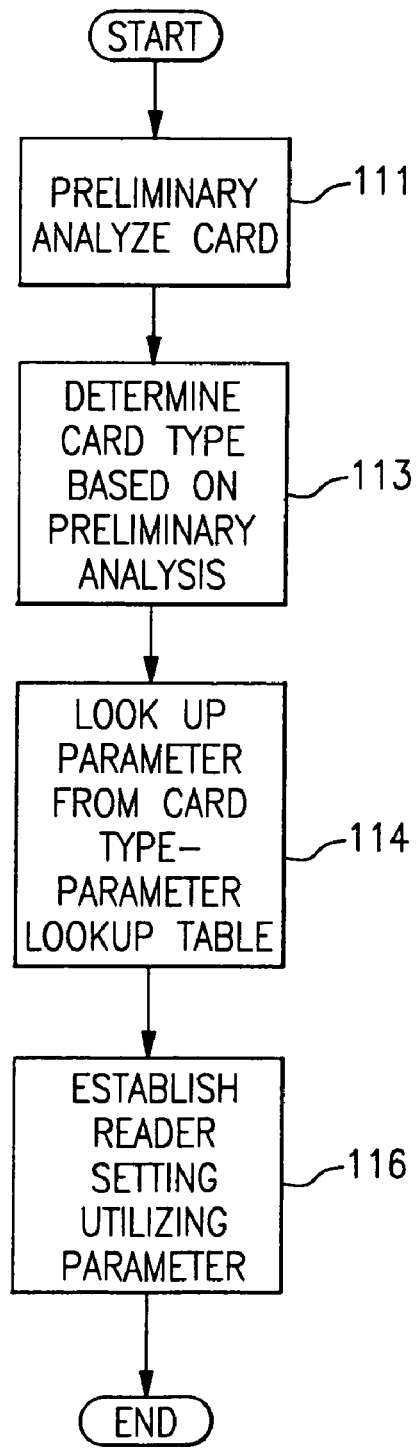
FIG.4a                    FIG.4b

| CARD TYPE | TRAY HEIGHT | THRESHOLD | FOCAL LENGTH | TOPSIDE | TOPSIDE | BOTTOMSIDE | BOTTOMSIDE |
|---|---|---|---|---|---|---|---|
| NEW YORK | 14mm | 140 | 10mm | OCR | — | OCR | CODE 128 |
| PENNSYLVANIA | 7mm | 120 | 9mm | CODE 39 | OCR | PDF | — |
| TEXAS | 3mm | 150 | 10mm | OCR | — | CODE 39 | — |

FIG.5

IDENTIFICATION CARD READER

FIELD OF THE INVENTION

The invention relates to reading devices in general and specifically to a reading device adapted to read a card such as an identification card.

BACKGROUND OF PRIOR ART

Identification cards issued by government agencies have grown in sophistication. Many state driver's licenses now have multiple dataforms which operate to redundantly encode personal information of the person identified by the card. New York State driver's licenses now include a text field including characters encoding personal information of the card owner, a linear bar code for encoding personal information of the card holder, and a 2D bar code symbol encoding personal information of the card holder. In spite of identification cards' increasing sophistication there have been few attempts to improve the reading and processing of identification cards. Identification cards continue to be altered without detection for criminal purposes including illegal purchasing of alcoholic beverages.

There is a need for improved processing of identification cards.

SUMMARY OF THE INVENTION

There is described a method and apparatus for processing a card. A card that is processed can have a corresponding card holder. In one embodiment, a card reader can be provided for reading information of a card. A card reader in one embodiment can be configured to sense a level of degradation of a card. A card reader in one embodiment can be in communication with a remote processor system.

These and other details, advantages and benefits of the present invention will become apparent from the detailed description of the preferred embodiment.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which:

FIG. 1c is a cross sectional side view of the card reader of FIG. 1a;

FIG. 1d is a perspective view of another identification card reader according to the invention;

FIGS. 1h, 1i, 1j show hand held mobile identification card readers according to the invention;

FIGS. 4a-4e are flow diagrams illustrating operation of a control circuit according to the invention; and FIG. 5 illustrates an exemplary lookup table according to the invention which may be stored in a reader memory and utilized for control of an identification card reader according to the invention.

DETAILED DESCRIPTION OF THE INVENTION

Figure 1A:
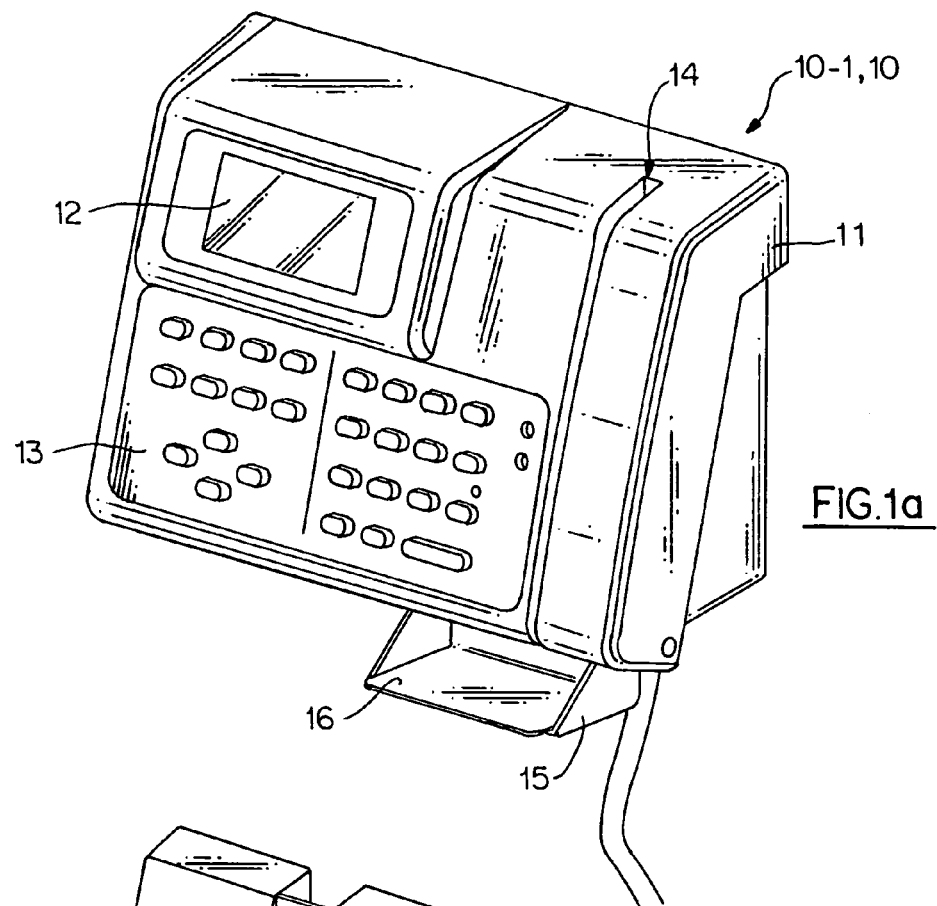
FIG. 1a is a perspective view of an identification card reader according to the invention.
Figure 1B:
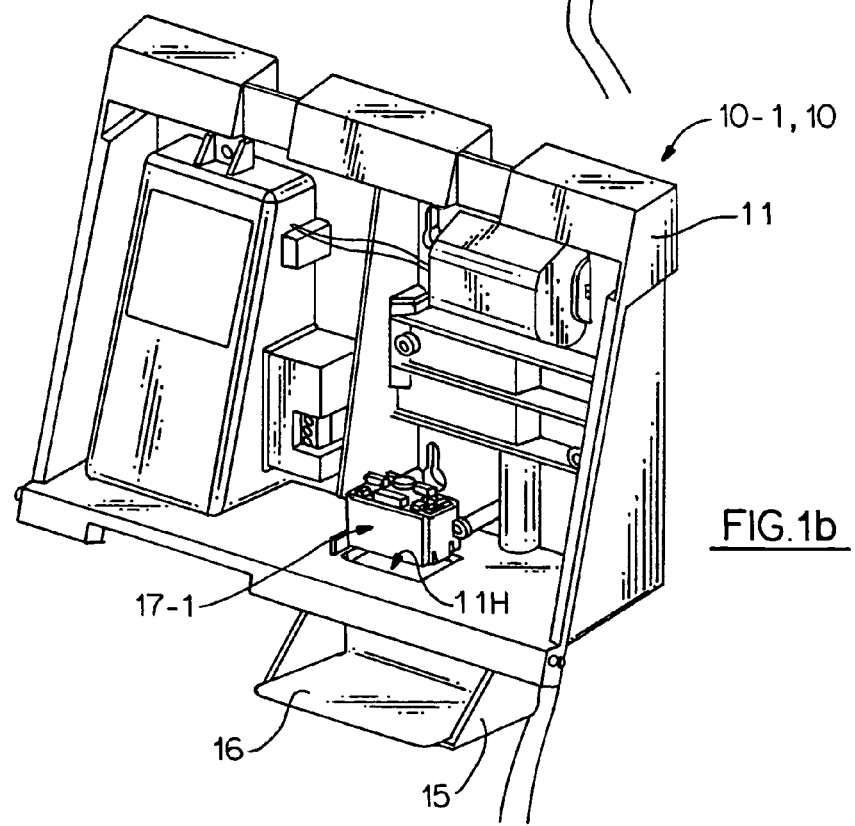
FIG. 1b is a perspective view of the card reader of FIG. 1a with cover removed.

An identification card reader according to the invention is described with reference to FIGS. 1a-5. Housings for reader 10 are described with reference to FIGS. 1a-1d.

Identification card reader 10 in one embodiment includes a housing 11, a display 12, a control panel 13 including control buttons, a magnetic stripe reader 14, a tray 15 for holding an identification card 16, and an optical reader module 17-1. Display 12 may display such information as decoded or recognized information form ID card 16, or user prompt information which instructs a user on how to use reader in a certain application. Control panel 13 is useful for entering information into reader 10 including control information which alters the operation of reader or data such as data pertaining identification card 16 or the person corresponding to the card. Magnetic stripe reader 14 allows decoding of magnetic stripe reading information from identification card 16 in the case that card includes a magnetic stripe. Tray 15 holds identification card in position allowing imaging capture and processing of the image information of the card by optics module 17-1. Reader 10 may also include other data input units such as an RF tag reader or a smart card reader 19.

Figure 2:
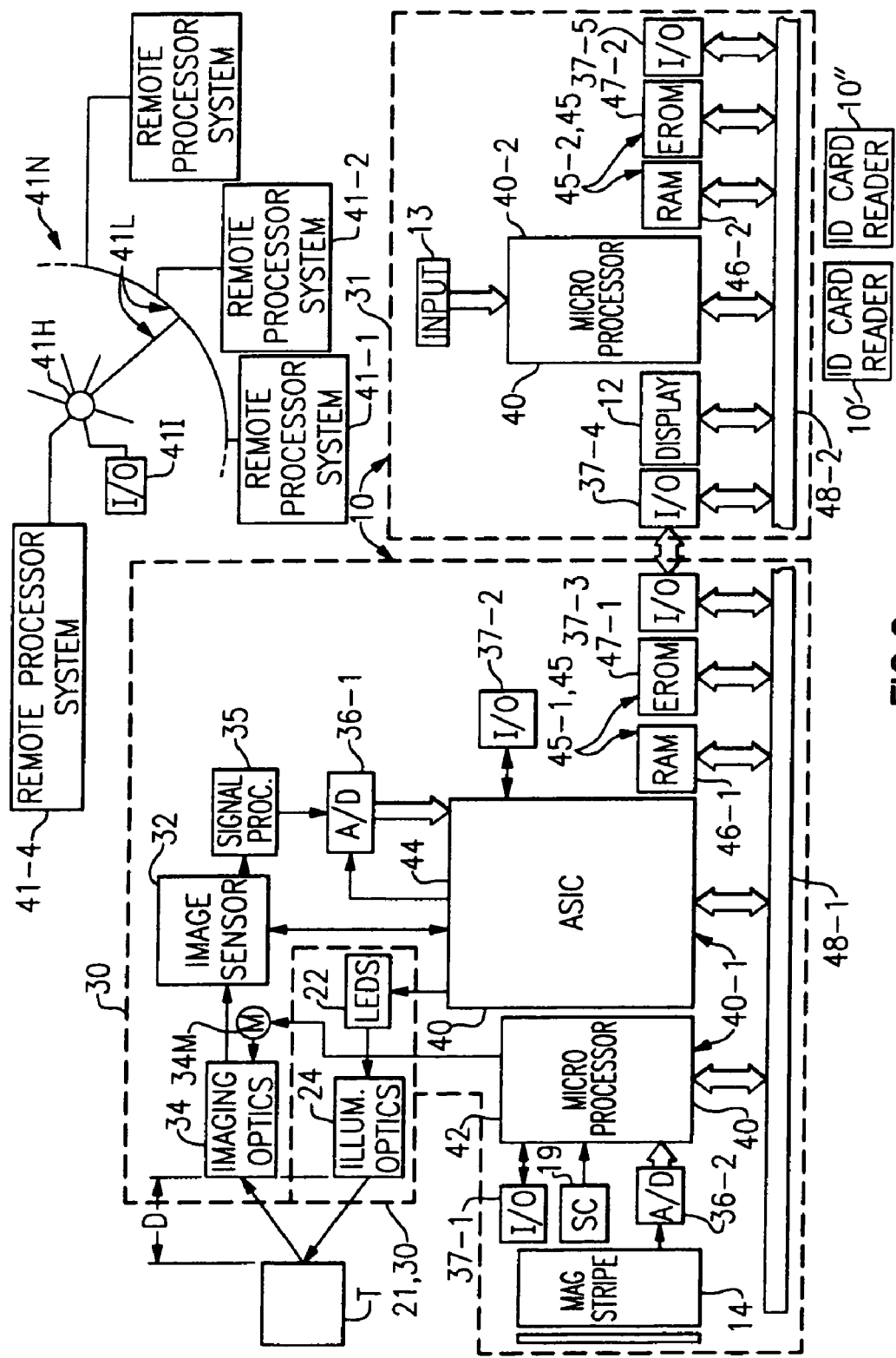
FIG. 2 is an electrical block diagram of an identification card reader of the invention.

Referring now to control features of the invention, a block diagram of the identification card reader 10 is shown in FIG. 2. Reader circuit 10 includes a reader processor system 30, an illumination system 21, and a reader host processor system 31. Reader processor system 30 captures an image of identification card, decodes decodable symbols of the card to generate a message, and transmits the message to reader host processor system 31. Identification card reader control circuit 40 includes a reader control circuit 40-1 and an integrated host control circuit 40-2.

Referring now to features of reader processor system 30, reader processor system 30 includes an illumination assembly 21 for illuminating a target object T, such as a 1D or 2D bar code symbol, and an imaging assembly 33 for receiving an image of object T and generating an electrical output signal indicative of the data optically encoded therein. Illumination assembly 21 may, for example, include an illumination source assembly 22, together with an illuminating optics assembly 24, such as one or more lenses, diffusers, wedges, reflectors or a combination of such elements, for directing light from light source 22 in the direction of a target object T. Illumination assembly 21 may comprise, for example, laser or light emitting diodes (LEDs) such as white LEDs or red LEDs. Illumination assembly 21 may include target illumination and optics for projecting an aiming pattern on target T. Illumination assembly 21 may be eliminated if ambient light levels are certain to be high enough to allow high quality images of object T to be taken. Illumination assembly may also be located remote from reader housing 11, at a location so as to eliminate or reduce specular reflections. An imaging assembly of reader 10 may include an image sensor 32, such as a 1D or 2D CCD, CMOS, NMOS, PMOS, CID OR CMD solid state image sensor, together with an imaging optics assembly 34 for receiving and focusing an image of object T onto image sensor 32. The array-based imaging assembly shown in FIG. 2 may be replaced by a laser array based imaging assembly comprising one or more laser sources, a scanning mechanism, emit and receive optics, at least one photodetector and accompanying signal processing circuitry.

Reader processor system 30 of FIG. 2 also includes programmable control circuit 40-1 which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45 which may comprise such memory elements as a read/write random access memory or RAM 46-1 and an erasable read only memory or EROM 47-1. RAM 46-1 typically includes at least one volatile memory device but may include one or more long term non-volatile memory devices. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2, but which devotes most of its time to decoding image data stored in RAM 46-1 in accordance with program data stored in EROM 47-1. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 33, etc. There is nothing in principle, however, that requires that any particular division of labor be made between processors 42 and 44, or even that such a division be made at all.

With processor architecture of the type shown in FIG. 2, a typical division of labor between processors 42 and 44 will be as follows. Processor 42 is preferably devoted primarily to such tasks as decoding image data, once such data has been stored in RAM 46-1, recognizing characters represented in stored image data according to an optical character recognition (OCR) scheme, handling menuing options and reprogramming functions. Processor 42 may also receive electrical signal information from magnetic stripe reader 14 as digitized by A/D converter 36-2. Processor 42 may also receive electrical signals from a smart card reader 19 or another data input source.

Processor 44 is preferably devoted primarily to controlling the image acquisition process, the A/D conversion process and the storage of image data, including the ability to access memories 46-1 and 47-1 via a DMA channel. Processor 44 may also perform many timing and communication operations. Processor 44 may, for example, control the illumination of LEDs 22, the timing of image sensor 32 and an analog-to-digital (A/D) converter 36-1, the transmission and reception of data to and from a processor system external to system 30, through an RS-232, a network such as an ethernet, a serial bus such as USB, a wireless communication link (or other) compatible I/O interface as is indicated by interface 37-1. Processor 44 may also control the outputting of user perceptible data via an output device, such as a beeper, a good read LED and/or a display monitor which may be provided by a liquid crystal display such as display 12. Control of output, display and I/O functions may also be shared between processors 42 and 44, as suggested by bus driver I/O interface 37-3 or duplicated, as suggested by microprocessor serial I/O interface 37-1 or interface 37-2. As explained earlier, the specifics of this division of labor is of no significance to the present invention.

Referring now to features of host processor system 31 host processor system 31 in the embodiment shown includes an I/O interface 37-5, display 12, a host control circuit 40-2 which may be provided by microprocessor, a memory 45-2 including RAM 46-2 and EROM 47-2, a system bus 48-2 and I/O interface 37-5 for communication with a remote processor system 41-1. Control circuit 40-2 receives decoded messages from reader processor system 30, receives user input information from control panel input 13, displays prompt information and other data on display 12, and controls the reception and transmission of data to and from remote processor system 41-1 via I/O interface 37-5.

I/O interfaces 37-1, 37-2, 37-3, and 37-4 facilitate digital communication in one of an available local digital communication technology such as RS-232, ethernet, serial bus including Universal Serial Bus (USB), or local wireless communication technology including "Blue Tooth" communication technology. I/O interface 37-5 facilitates digital communication with remote processor system 41-1 in one of available remote communication technologies including dial-up, ISDN, DSL, cellular or other RF, and cable. Remote processor system 41-1 may be part of a network 41N of processor systems as suggested by systems 41-2, 41-3, and 41-4 links 41L and hub 41H, System 41-1 may be a network server. The network 41N to which system 41-1 belongs may be part of the internet. In addition to being in communication with identification card reader, system 41-1 is typically in communication with a plurality of additional identification card readers 10' and 10." Reader 10 may be part of a local area network (LAN). Reader 10 may communicate with system 41-1 via an I/O interface of system 41-1 or via an I/O interface of network 41N such as a bridge or router. While the components system 30 and system 31 are indicated in FIG. 2 to be discreet elements it is understood that integration technologies has made it possible to form numerous circuit components on a single integrated circuit chip. For example, with present fabrication technologies, it is common to form components such as components 37-4, 40-2, 46-2, and 47-2 on a single piece of silicone.

Furthermore, the number of processors of reader 10 is of no fundamental significance to the present invention. In fact if processor 42 is made fast enough and powerful enough special purpose processor 44 can be eliminated. Likewise a single fast and powerful processor can be provided to carry out all of the functions contemplated by processors 40-2, 42, and 44 of the specific circuit shown in FIG. 2. Still further, it is understood that if reader 10 includes multiple processors the processors may communicate via parallel data transfers rather than via the serial communication protocol indicated by serial busses 48-1 and 48-2.

Now referring to specific aspects of the invention in further detail, aspects of tray 15 are described with reference to FIGS. 1a-1d. Tray 15 holds card 16 in the field of view of image sensor 32. Preferably the dimensions of tray 15 substantially correspond to the field of view of image sensor 32, and is sized to a size substantially corresponding to the largest expected card size. In the embodiment 10-1, 10 of FIG. 1a, housing 11 is a modified transaction terminal housing that is modified in that it includes a bottom mount tray 15 and a hole 11*h* for allowing an imaging optical path to pass through to the interior of housing 11. In the embodiment 10-2, 10 of FIG. 1*d*, housing 11 is a modified transaction terminal housing in that it includes a side mounted tray assembly 15*a*, including tray 15. Back wall 15W of tray assembly 15*a* in addition to providing mechanical support for tray 15, prevents ambient light rays emanating from light sources behind reader 10 from reaching card 16 thereby reducing glare and further provides a benching point for card 16, as will be described further herein. Imaging module 17-2 is mounted on top of tray assembly 15*a*.

Figures 1C, 1D:
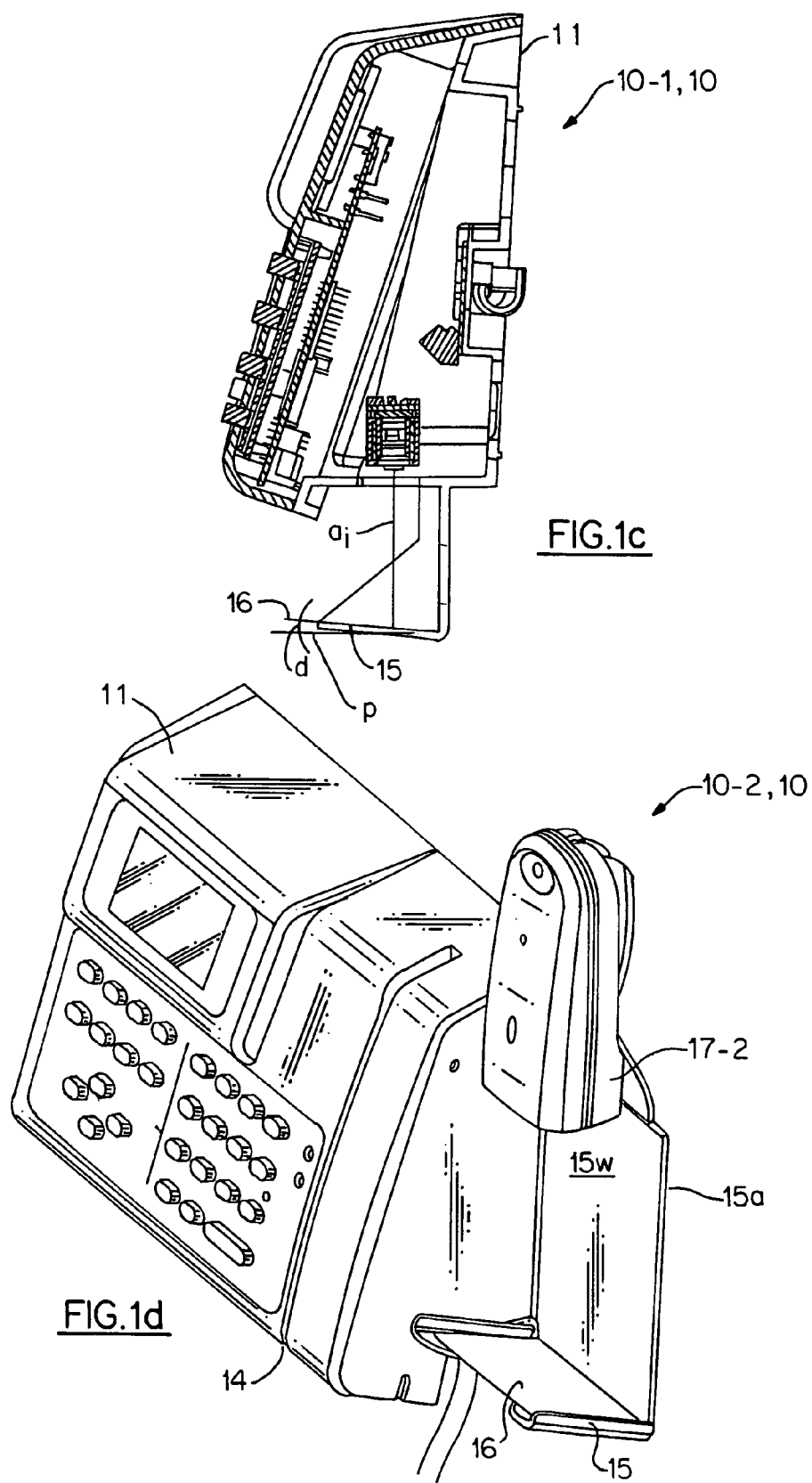

An important feature of the invention is that tray 15 forms an angle, ∝, with plane P as best seen in FIG. 1*c*. Plane P is the plane perpendicular to the reader's imaging axis, $a_i$. Further, tray 15 is preferably abutted against or formed integral with back wall 15W. Preferably, the angle, ∝, is more than about 10 degrees. Mounting tray 15 at an angle, ∝, with respect to plane P reduces specular reflections. That is, mounting tray 15 at an angle, ∝, more than about 10 degrees assures that light rays generated by an illumination system of reader 10 are reflected at an angle with respect to imaging axis, $a_i$, so as not to be reflected back toward image sensor 32. Establishing tray 15 at an angle with respect to a horizontal axis, (which in parallel to plane P in the example shown) and abutting tray 15 against back wall 15W, further operates to stabilize card 16 within tray 15, reducing the likelihood that the position of card 16 can be altered during the course of card reading. The interface between tray 15 and back wall 15W further provides a benching point upon which every card that is situated in a reader can be benched. The benching of various cards at a consistent benching position simplifies image data capture and processing of various cards.

Figure 1E:
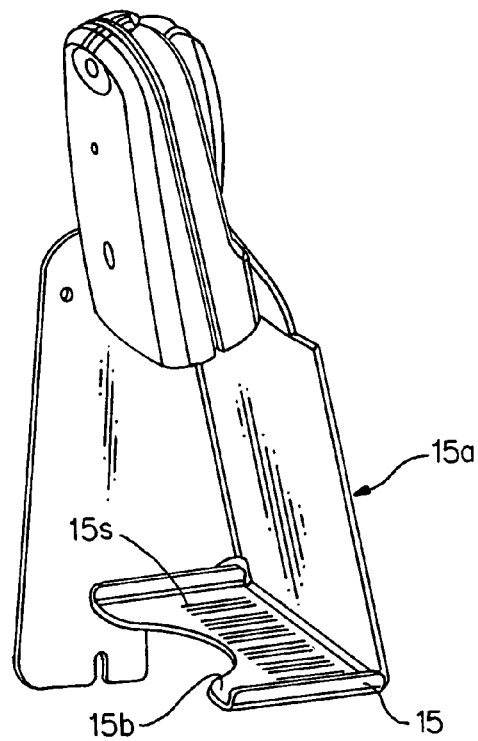
FIGS. 1e, 1f, and 1g are perspective views of alternative tray assemblies according to the invention.

Referring to further aspects of tray 15, bottom surface 15*b* of tray 15 may include an object detection symbol 15*s* formed thereon as seen in FIG. 1*e*. In a first state, control circuit 40 is adapted to continuously capture an image representation that includes a representation of symbol 15*s*. When control circuit 40 determines that symbol 15*s* no longer is represented in the image representation, control circuit 40 switches operation of the imaging and illumination system of reader 10 to a second state. The control circuit's failure to detect a representation of symbol 15*s* in a captured image representation indicates that an object (i.e. an identification card) has been placed in the field of view of the imaging assembly. The second state may differ from the first state in that the illumination level increases. The second state may further be characterized by a higher frame capture rate relative to the first state and a more robust decoding algorithm relative to that in the first state (in the first state, the control circuit need only verify that a symbol of known characteristic is located in a known position). Further aspects of object detection symbol 15, and of a control circuit which may capture image data corresponding to such a symbol are described in detail in commonly assigned U.S. Pat. No. 5,949,052, incorporated herein by reference. As is indicated in the embodiments of FIGS. 1*h*, 1*i*, and 1*j* an identification card reader of the invention can be partially or entirely hand held and portable. Reader 10-3 in the embodiment of FIG. 1*h* comprises a stand 10*s* and a hand held portable data collection device, or PDT 10*p*. PDT 10*p* may be provided by, for example, a DOLPHIN PDT device, available from HHP, Inc. of Skaneateles Falls, N.Y. PDT 10*p* includes an imaging module 17-1 disposed at a front end 10*pf* thereof and, a display 12 and control panel 13 disposed in a top 10*pt* thereof. Stand 10*s* includes a base 1*ob*, an integrated tray assembly 15*a* and a tray 15. Stand 10*s* further has incorporated therein a mag stripe reader 14 which is electrically connected to device 10*p* when device is mounted in stand 10*s*. In the embodiment of FIG. 1*h* tray 15 and PDT 10*p* are arranged and tray 15 is provided with a hole 15*h* so that reader 10-3 captures images corresponding to tray-contacting surface 16*tc* of card 16 when card rests in tray 15.

In the embodiment of FIG. 1*i* identification card reader 10-4, 10 is entirely portable and hand-held. Reader 10-4, 10 includes a PDT section 10*p* having a control panel 13, an imaging module 17-1, and a display 12. Reader 10-4, 10 further includes an integrated mag stripe reader 14 and tray assembly 15*a*. Tray assembly 15*a* supports a tray 15 which, as in the embodiment of FIG. 1*h* supports a card in a position in relation to module 17-1, and includes a hole 15*h* so that reader 10-4, 10 captures an image corresponding to tray-contacting surface 16*tc* of card 16.

As can be seen by FIG. 1*j* reader 10-4, 10 can be oriented in a "tray down" orientation opposite of the "tray up" orientation indicated in FIG. 1*i*. In a "tray down" orientation, reader 10-4, 10 can be positioned in a stable position by placing reader 10-4, 10 on a flat surface so that tray 15 and end 15*ae* of tray assembly 15*a* contact a flat horizontal surface such as a counter top. Thus, when in the orientation shown in FIG. 1*j* tray 15 partially forms a base of an integrated reader stand. Card 16 is rested on interior surface 15I of tray 15 when reader 10-4, 10 is oriented in a "tray down" orientation. Reader 10-4, 10 when oriented as shown in FIG. 1*j* captures an image corresponding to a non-tray contacting surface 16*n* of card 16.

Figure 1F:
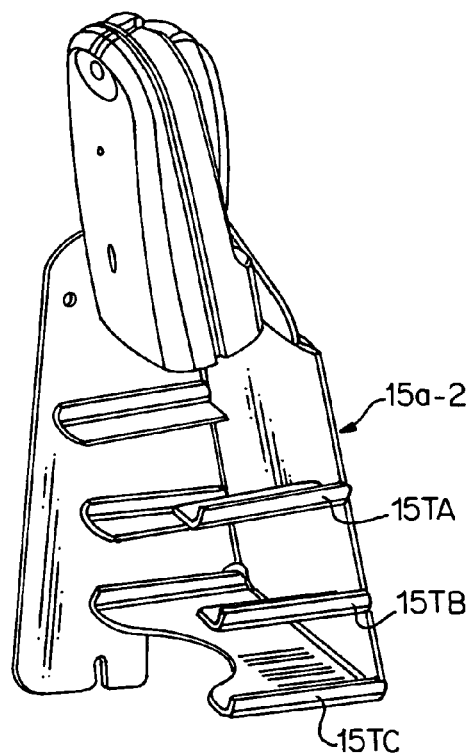

In the embodiment of FIG. 1*f*, tray assembly 15*a*-2 includes multiple trays. Identification card 16 is placed on the tray 15TA, 15 TB, or 15TC at which the card is at the best reader-to-target distance for the particular card. The best reader-to-card distance for a particular card may vary depending on such factors as the type of print, card dimensions, the grey scale, the print size, symbol size, the symbology type of symbols on the card, the processing required for the particular type of card, etc. In one embodiment, control circuit 40 may display on display 12 a prompt which indicates to an operator the best tray for that particular card. Prior to displaying a prompt indicating the proper tray selection, the control circuit 40 may first display a prompt prompting the operator to enter the card type (such as jurisdiction designation of the card) or may preliminarily determine the card type (the jurisdiction designation) by preliminary analysis of the card such preliminary analysis may encompass e.g. color analysis, grey scale analysis, size analysis, font analysis, symbol analysis, or partial frame image analysis of the card.

Figure 1G:
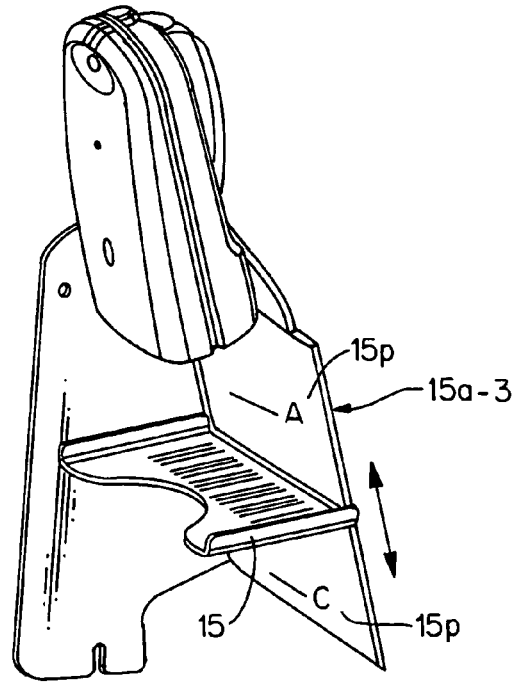
Figure 1J:
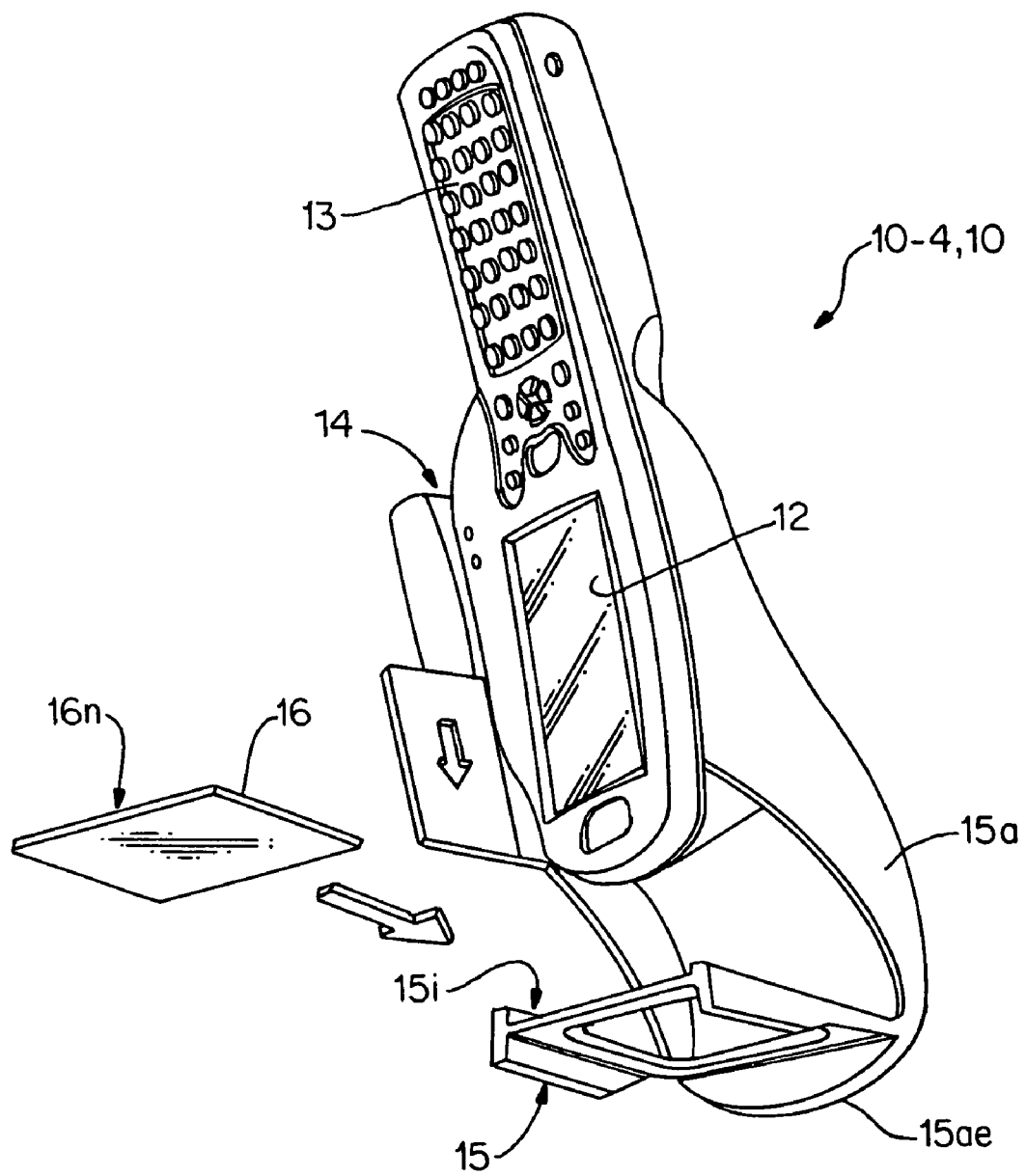

The tray assembly of the identification card reader 10 may also comprise an adjustable tray as is indicated by tray assembly 15*a*-3 shown in FIG. 1*g*. Tray 15 may be made adjustable to various heights within assembly 15*a* by way of a standardly known adjustment mechanism including a detent and spring mechanism or a screw and wing nut clamp mechanism. The height of tray 15 can also be automatically controlled by a conveyor moved by the force provided by a conveyor motor in communication with control circuit 40. Printed matter 15P on assembly 15*a*-3 may indicate various predetermined height positions. Control circuit 40 may be adapted to display prompts on display 12 indicating the proper tray height for a particular card or application. In the case of a tray whose height is automatically adjusted by a motor force, control circuit 40 may automatically adjust the height of tray 15 to an appropriate height by way of control signals input to the motor providing the motor force.

While tray 15, by positioning card 16 in a specific position in relation to image sensor 32, enhances the capacity of reader 10 to efficiently capture and process images corresponding to card 16, it will be understood that tray 15 is not necessary for the operation of reader 10. In embodiments of the invention that do not have tray 15, an operator places card 16 on a counter top or else holds card 16 in the field of view of image sensor 32 to allow reader 10 to read card 16. Tray 15 is expected to become less important to the performance of reader 10 as processing speeds and image sensor resolutions continue to improve.

Reader 10 may be adapted so that operation parameters of reader 10 other than tray height vary depending upon the card type. For example, reader 10 may be adapted so that a thresholding level for use in digitizing grey scale values of a captured image captured by reader processor system 30 vary depending upon card type. Some types of identification cards may be produced to have significantly higher average gray scale values than other types of cards. The decoding and recognition processing of cards exhibiting higher overall grey scales can be enhanced by adopting higher thresholding values for such cards. Other operation parameters similar to the parameter of a threshold value which may be made to vary depending upon card type include gain control, exposure time, and illumination level.

Reader 10 may also be adapted so that a focal length of imaging system 32 and 34 varies depending on the card type. The processing of a certain card type may be optimized by varying the focal length of imaging system comprising components 32 and 34. The focal length of an imaging system may be varied by physical movements of imaging optics 34 relative to sensor 32 with use of motor force provided by motor 34M.

Flow charts illustrating a reader adapted to vary an operation parameter such as tray height, threshold value or focal length depending upon card type are shown in FIGS. 4a and 4b. In one embodiment of the invention, illustrated with reference to the flow diagram of FIG. 4a, control circuit 40 at block 110 prompts a user for information regarding the card type. In the case that card is a state issued card such as a state driver's license, the card type is the jurisdiction of the card. Card reader memory 45 may be programmed with a default card type. For example, if reader 10 is located in a New York State retail store and card 16 is a state issued driver's license the default card type is normally programmed to be "New York." Accordingly, the prompt displayed on display 12 may be "IS CARD FROM NY (Y/N)." If the user responds "No" to such a prompt, control circuit 40 may issue appropriate additional prompts until the user enters via control panel 13 information indicating the actual card type. Control circuit then reads the user-input information at block 112.

In the alternative, control circuit 40 may be adapted to prompt for card ID information at block 110 only in the case that control circuit 40 fails to read card 16 utilizing a processing protocol that is in accordance with the default card type. For example, if card 16 is a state-issued identification card and reader 10 is located in a New York state retail store, reader 10 may be adapted to first attempt to process card 16 in accordance with a New York state processing protocol as determined at least in part from lookup table 140, to be described hereinbelow, and may be adapted to prompt for alternative card type information at block 110 only in the event that card processing fails utilizing the New York state processing protocol.

At block 114 control circuit 40 determines a card type variable operation parameter from a lookup table such as lookup table 140. Lookup table 140 includes card types correlated with at least one operation parameter. Lookup table 140 includes the operation parameters of tray height, threshold value, and focal length. When reader 10 determines the operation parameter from lookup table 140 at block 114, control circuit 140 utilizes the parameter in the control of a certain reader component at block 116, such as motor 34M, so that reader operation varies depending upon the card type.

In accordance with the embodiment described in the flow diagram of FIG. 4b, reader 10 operates in the manner described with reference to the flow diagram of FIG. 4a except that reader 10 determines the card type automatically rather than determining the card type based on user input. Control circuit 40 may automatically determine the card type at blocks 111 and 113, for example, by decoding one symbol on the card out of a plurality of symbols, decoding a limited number of OCR characters on the card, color analysis of the card, size analysis of the card, transmittance of the card, grey scale analysis of the card or by image analysis corresponding to a section of the card.

In another aspect of the invention, control circuit 40 is adapted to display on display 12 which prompts a user to take certain action relative to reader 10 and/or card 16 in the event of card reading failure. For example, if during image analysis control circuit 40 determines that a card cannot be read, control circuit 40 may display a prompt on display 12 such as "REORIENT CARD" so that a user changes the position of the card with respect to tray 15. Control circuit 40 may display a "FLIP CARD" prompt on display 12 if image analysis reveals that a card has been positioned on tray 15 upside down. Control circuit 40 may display a "MOVE CARD TO TRAY _" on display 12 if by image analysis control circuit 40 determines that image processing would improve at a different image sensor to target distance.

Figure 3A:
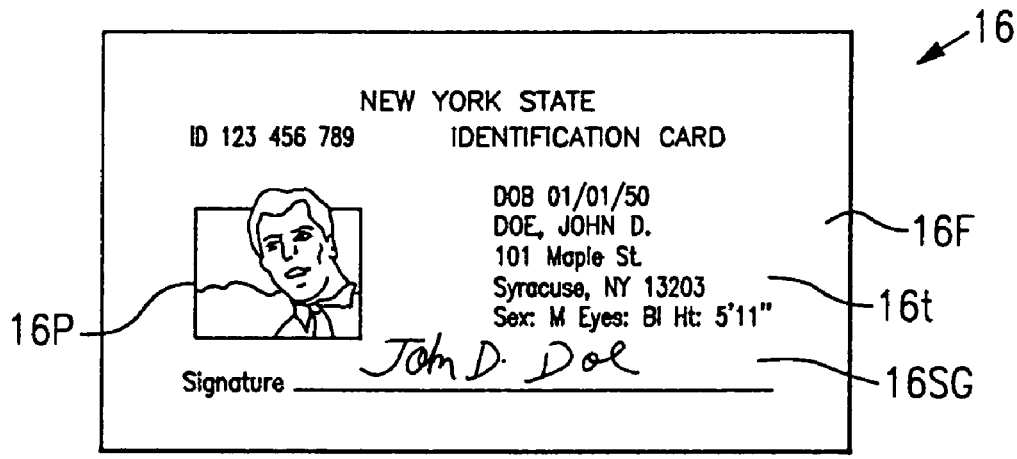
FIGS. 3a and 3b show a topside and a bottomside of an exemplary identification card.
Figure 3B:
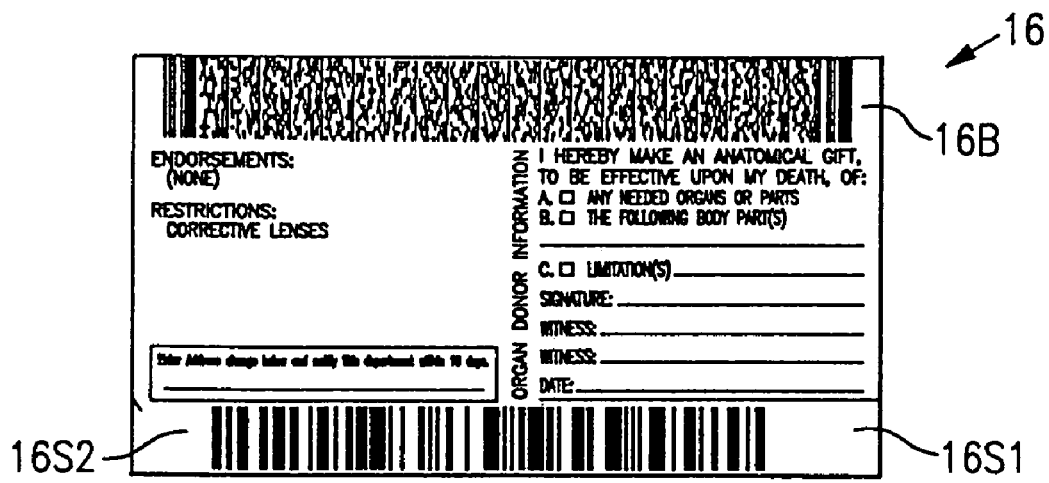

Referring to further aspects of the invention, control circuit 40 may be adapted to execute one or more routines in order to check the authenticity or validity of the card. In a routine described with reference to typical card format shown in FIGS. 3a and 3b, control circuit 40 checks the validity of a card by comparing the information contained in one dataform of a card to another dataform of a card. As seen in FIGS. 3a and 3b a typical identification card 16 includes more than one dataform. In the example of FIG. 3a, the top surface 16f of card 16 includes text characters 16T, photograph 16P, signature 16SG and the bottom surface 16b of the card includes two symbols 16s1 and 16s2, a 1D symbol "code 128" symbol and a 2D symbol, "PDF."

Figure 4C:
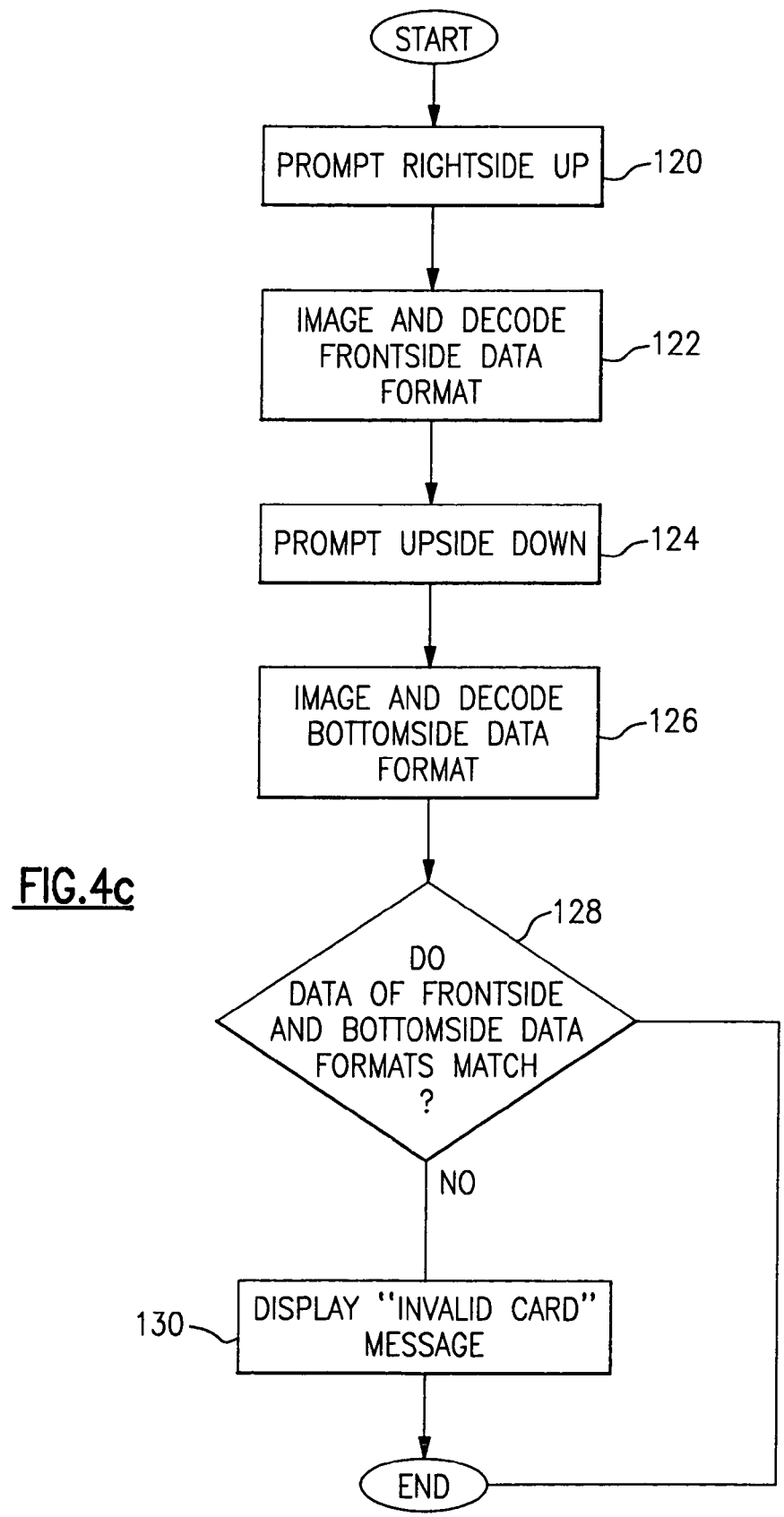

Referring to the flow diagram of FIG. 4c, control circuit 40 at block 120 displays on display 12 a prompt such as "PLACE CARD IN TRAY RIGHTSIDE UP" in order to prompt a user to place card 16 in tray 15 rightside up. Control circuit 40 at block 122 then decodes the dataform of the top side of the card. In the example of FIG. 3a, this information is encoded in text character 16T. Accordingly, at block 122 control circuit 40 may execute an OCR decoding algorithm in order to decode the data of the front side. At block 124 control circuit 40 then displays a prompt such as "FLIP CARD OVER" in order to prompt a user to turn the card 16 to an upside down position. At block 126 control circuit 40 decodes the decodable dataforms of the bottom-side surface of the card 16. In the example of FIG. 3b control circuit 40 decodes the 1D code 128 symbol 16s2 and the 2D PDF symbol 16s1 of the bottom side 16b. At block 128 control circuit 40 compares the decoded data of at least one topside dataform (in the case given the decodable character data) with the decoded data of at least one bottomside dataform (either or both the 1D or 2D symbols in the example of FIG. 3b). Symbologies of identification cards normally redundantly encode character data of the card. Accordingly, if the data message decoded from a card symbol and decoded data decoded from text character data of a card do not match there is a strong indication of card alteration (character alteration or symbol transposing). At block 130 control circuit 40 may display on display an "INVALID CARD" message if control circuit 40 at block 128 determines that the decoded data of the front side of the card does not match decoded data of the bottom side of the card. Control circuit 40 may further analyze multiple dataforms of a single card side (i.e. symbol 16s1 and symbol 16s2) and display an "INVALID CARD" prompt on display 12 in the case of a mismatch.

Certain types of 2D symbols, including DataMatrix, MaxiCode, and PDF symbols such as symbol 16s1 are encoded with redundant bar-space information so that if a portion of the symbol becomes degraded, a reader reading the symbol can nevertheless decode the message of the symbol. Symbols that can be decoded despite being partially unreadable are said to have "error correction" encoded therein. Readers reading such redundantly-encoded symbols can return a value known as an "error correction value," which is a measure of the amount of a symbol's available error correction that has been used. In accordance with a further aspect of the invention, control circuit 40 is adapted to display messages on display 12 that vary depending upon the error correction value returned when a symbol of card 16 is read. That is, control circuit 40 may be configured to display messages on display 12 that vary depending upon the level of degradation of a card and more particularly, a card's symbol.

In one embodiment of the invention, control circuit 40 may be adapted to enter a "Card Quality Estimator" routine in response to appropriate control by an operator input via control panel 13. Control circuit 40 may also be configured to enter a "Card Quality Estimator" routine automatically, for example, on the condition that control circuit 40 consumes more than a predetermined time in reading a card's symbol or on the condition that control circuit 40 attempts to decode a card symbol more than a predetermined number of times before successfully decoding a card symbol.

After having entered the "Card Quality Estimator" routine, control circuit 40 displays on display 12 a message that varies depending upon the level of error correction. For example, control circuit 40 may display a message that simply indicates the amount of error correction used in decoding a card symbol, "_ PERCENT AVAILABLE ERROR CORRECTION USED." Control circuit 40 may also display on display 12 a message such as "CARD OK" if the error correction value is below a first predetermined value, such as below 50 percent. Control circuit 40 may further display on display 12, for example, a first warning message such as "CARD DEGRADED" if the error correction value is above the first predetermined value, and a second warning message such as "CARD MUST BE REPLACED" if the error correction value is above a second predetermined value such as above about 80 percent. With or without entering a "Card Quality Estimator" routine, control circuit 40 may upload error correction information corresponding to processed cards to remote processor system 41-1 which may be a central (and perhaps state-controlled) host processor in communication with several readers and which may have stored therein database correlating cardholder names, or another identifier with card degradation status. Remote processor system 41 may be configured to issue an instruction designed to result in a notice or a new card being sent to a cardholder if the card degradation database indicates that the degradation status of a cardholder's card has exceeded a predetermined level.

As indicated previously, lookup table 140 may include control type operation parameters which aid in determining the processing steps to be executed in processing a particular type of identification card. As seen in FIG. 5 card type lookup table 140 may correlate card type listed in column 142 with dataform data 149 corresponding the card type. Lookup table 140 may include topside column 149f1 and 149f2 which encode the dataforms of the card top side and bottomside columns 149b1 and 149b2 which encode the dataform(s) of the card bottomside. When decoding card 16, control circuit 40 may access table 140 to determine the data form type of card based on the card type prior to selecting an OCR or symbol decoding algorithm. When decoding decodable dataforms of card control circuit may deactivate dataforms not listed in data 149. Further, as a security routine, control circuit 40 after determining the card type (which may be in accordance in a default setting) may capture image data corresponding to a card 16, access lookup table 140 to determine the dataforms which should be present on the card, then analyze the image data to verify that those dataform types are in fact represented in the card image data. Control circuit 40 may display an "INVALID CARD" message on display 12 if all of the dataforms which should be on card 16 are not in fact on card 16.

Lookup table 140 may also include columns which encode a card's dimension and the position of dataforms on the card in order to further improve the speed of card decoding. As discussed previously, control circuit 40 may determine a card type either by executing an algorithm for automatic determination of card type or by prompting a user for card type information and reading the user input data.

In another card security routine of the invention, control circuit 40 may read symbol-encoded image information from a card having a symbol including image information. Technologies are known for encoding image information in bar code symbols. For example, the Kodak Image Verification System (Kodak IVS) enables an image of a human face or of a signature can be encoded in 400 bits of memory space. Utilizing the Kodak IVS system, images can readily be stored in 2D bar code symbol, magnetic stripes and/or smart cards. Utilizing this technology, photographs e.g., 16p, can be decoded and expressed as data messages. In accordance with one security routine of the invention, control circuit 40 may decode symbol-encoded image information from a card symbol e.g. symbol 16s1 encoded with image information corresponding to a card owner's face, and display such image information on display 12. Control circuit 40 may further display for comparison side by side on display 12 the symbol-encoded image information captured image data corresponding to the photograph 16P of an identification card 16 or to a photograph of the card presenter, taken by a supplementary camera (not shown) of reader 10.

Similarly, control circuit 40 may decode symbol-encoded image information from a card symbol e.g. symbol 16s1 encoded with image information corresponding to a card owner's signature, and display such image information on display 12 for comparison to a signature 16SG of card or to another signature provided by a card presenter at the time of card presentation. Control circuit 40 may further display for comparison side by side on display 12 the image data captured from card 16 corresponding to signature 16SG, or to other electronic signature data entered into reader 10 using electronic signature capture technology such as touch screen type signature capture technology or imaging-based electronic signature capture technology. In addition to displaying symbol encoded decoded face or signature image data on display 12 side by side other electronically stored face or signature data, control circuit 40 may electronically compare symbol encoded decoded face or signature image data to other electronically represented face or signature data, and may display on display 12 an "INVALID CARD" message if there is a mismatch of such data.

Signature verification systems are available from such entities as Datavision, Inc., Signcheck, Inc., Cybersign, Inc. and Quintet, Inc.

Figure 4D:
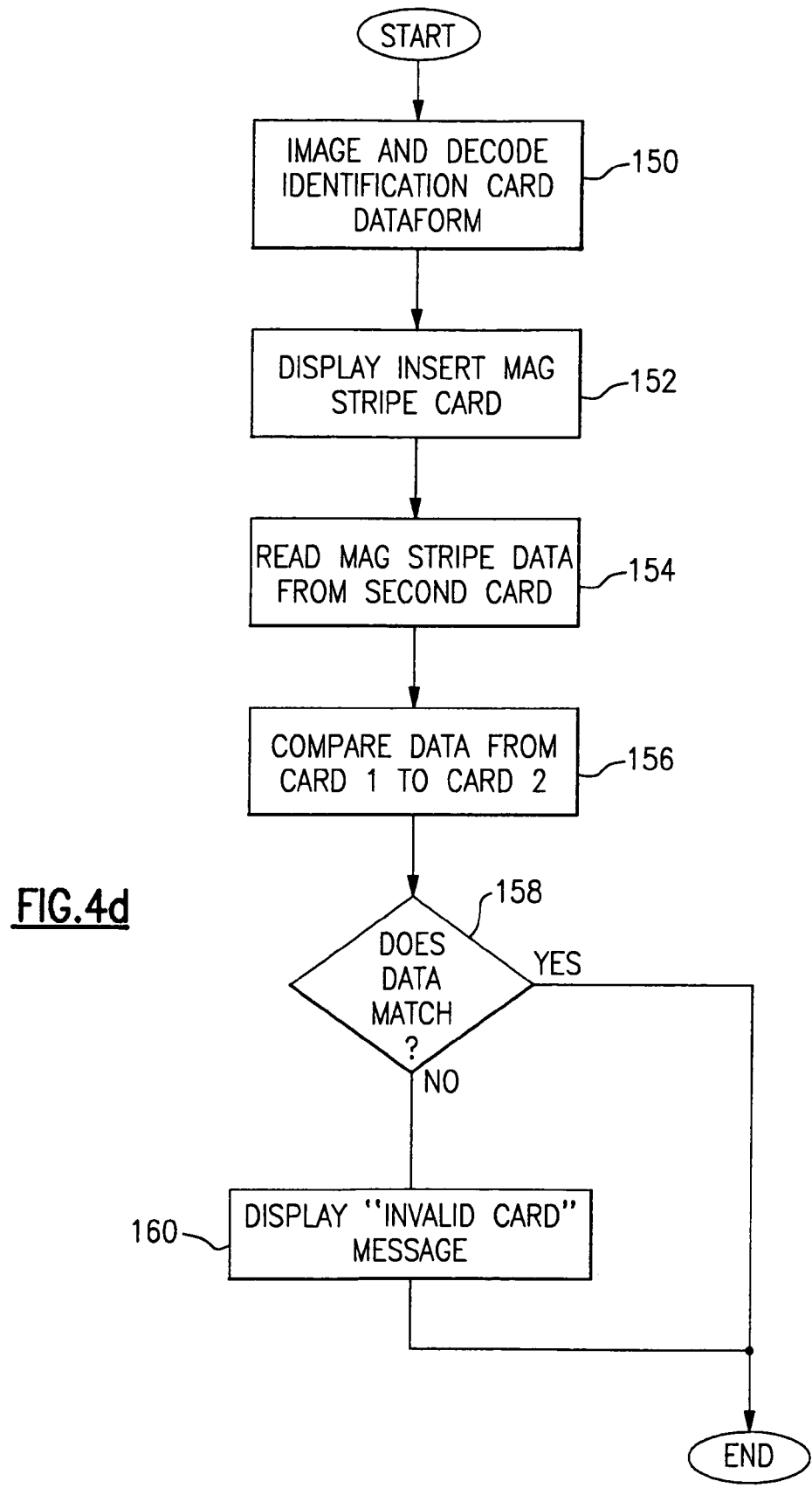

In another card security routine according to the invention described in connection with the flow diagram of FIG. 4d control circuit 40 may prompt a user to utilize reader 10 in order to read an identification card other than card 116. For example, after reading at least one dataform of card 16 at block 150 control circuit 40 may display on display 12 at block 152 a prompt message such as "INSERT CREDIT CARD IN MAG STRIPE READER" in order to prompt a user to swipe a credit card through mag stripe reader 14 of card reader. After reading the mag stripe encoded data ar block 154, control circuit 40 may then at block 156, compare the identification card data determined by image analysis of a card to the identification card data determined my mag stripe reader 14 to verify the card information. If control circuit 40 at block 158 determines that the data from the two cards does not match, control circuit 40 at block 160 may display an "INVALID CARD" message on display 12. As indicated by the block diagram of FIG. 2, control circuit 40 can be in communication with mag stripe reader 14. Control circuit 40 can be programmed to decode a data form from a first card to generate a first decoded message, read mag stripe data from a second card to generate a second decoded message, and compare the first and second decoded messages.

Figure 4E:
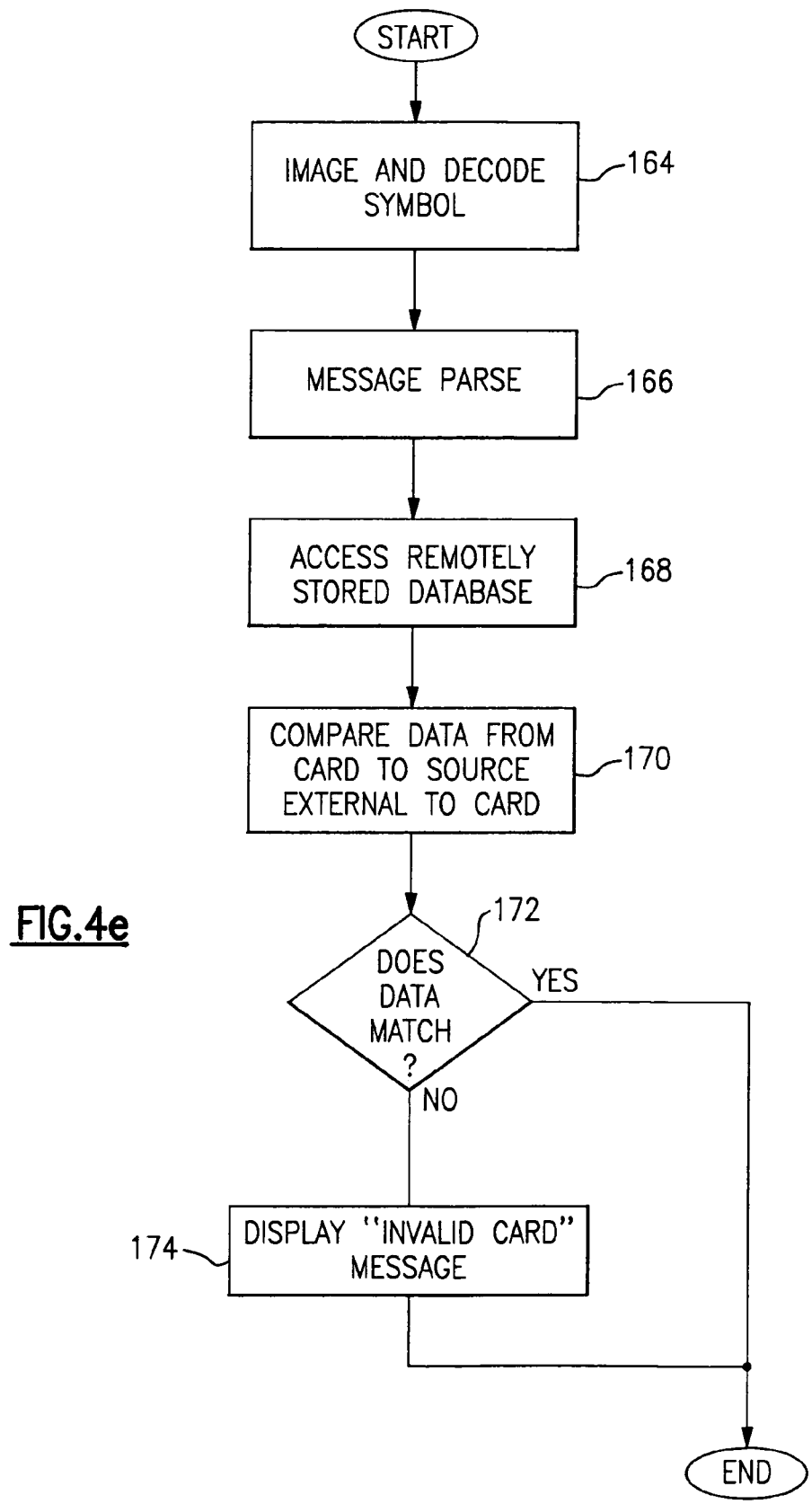

In yet another card security routine described with reference to the flow diagram of FIG. 4e control circuit 40 compare data determined by decoding dataforms of card 16 to data determined from a source other than card 16. At block 164 control circuit 40 may read symbol 16s to determine a message encoding name and street address information of a card holder. At block 166 control circuit 40 parses data from one certain field of the message from the remaining data of the message. In one specific example of the invention, control circuit 40 parses name field data of the message from the remaining data of the message. At block 168 control circuit 40 accesses an externally stored database that correlates name information with street information to determine street information corresponding to the name of the person from a source external to card 16. The externally stored database may be stored on a memory device of a server of a network e.g. network 41N which may be part of the internet. The externally stored database may also be stored on a memory device integrated into reader 10. For example, the externally stored database may be stored in a hard drive memory or compact disk (not shown) that is linked to system bus 48-2. At block 170 control circuit 40 compares card-determined street information to the street information determined from the external source. If control circuit 40 at block 172 determines that there is a mismatch in the data, control circuit 40 at block 174 may display an "INVALID CARD" message on display 12.

The invention is an identification card reader for reading identification cards. The reader includes a housing, control circuit, an imaging module, a display, and a tray for holding an identification card in a certain position relative to an imaging module. The control circuit may be in communication with a card type-operation parameter lookup table so that operation parameters including control type operation parameters of the reader vary depending upon the type of card being processed by the reader. The reader may be programmed to execute one or more security routines for verifying the validity of the presented card.

According to its major aspect and broadly stated the invention is an identification card reader for use in reading and validating identification cards.

The identification card reader includes a housing having an imaging assembly, a control circuit, a control panel, a display, and a tray assembly which comprises at least one tray. The at least one tray holds an identification card in a certain position in relation to the housing so that the imaging assembly can capture an image representation of an identification card. The at least one tray is angled at an angle with respect to a plane perpendicular to the imaging axis of the reader so that specular reflections are reduced.

In one embodiment the tray assembly includes multiple trays. The control circuit prompts a user to position a card on a certain one of the trays. The tray assembly may also comprise an adjustable tray. In an embodiment having an adjustable tray, the reader to target distance may be varied either manually or automatically. The tray may have an object detection symbol disposed thereon for controlling the changing of operation states of a reader between active and inactive operating states.

The control circuit may be adapted to establish an operation parameter of the reader based on the type of card being read. A reader memory may include a lookup table correlating reader types with operation parameters which may vary depending upon the type of card. Operation parameters which may vary depending on the type of card being processed include tray height, threshold value, focal length, gain, exposure time, illumination level, and control type operation parameters. Control-type operation parameters are operation parameters which determine, for example, whether or not a certain decoding algorithm will be active during the processing of the card, whether or not both sides of a card will be subjected to image capture, and whether or not an operator will be prompted to present a second identification card to a reader.

In one validation routine of the invention the control circuit reads a dataform of a first side of a card, reads a dataform of a second side of the card and compares the data decoded from the two sides. In another validation routine, the control circuit, after reading a dataform from a first identification card prompts a user to present a second identification card to the reader. For example, the control circuit may prompt a user to swipe a mag stripe card carrying information of the cardholder then compare the data determined from the two separate cards. In another validation routine, the control circuit decodes a dataform message, parses the message, accesses a remotely stored database correlating the parsed field data with subject matter corresponding to remaining message data, then compares the message data with the remote database data corresponding to the parsed field data.

Additional specific embodiments are as follows:

A1. An identification card reader for processing an identification card having at least one dataform, said reader comprising:
a housing having at least a bottom and a side;
a control panel disposed on said housing;
a display disposed on said housing;

a control circuit in communication with a memory;

a tray assembly mounted to said housing, said tray assembly having a tray for receiving said identification card; and and an imaging assembly in communication with said control circuit having an imaging axis passing through said tray.

A2. The card reader of claim A1, wherein said housing includes a hole, and wherein said at least one tray opposes said hole, wherein said imaging axis further passes through said hole, and wherein an object detection symbol is disposed on said at least one tray.

A3. The card reader of claim A1, wherein said tray is plate perpendicular to said imaging axis so that specular reflections are reduced.

A4. The card reader of claim A1, wherein said tray assembly includes a plurality of trays.

A5. The card reader of claim A1, wherein said at least one tray is adapted to be of adjustable height.

A6. The card reader of claim A1, wherein said memory includes a lookup table that correlates card type with tray height, and wherein said control circuit determines a card type of said card and reads data from said lookup table to determine a tray height for said card based on said card type.

A7. The card reader of claim A1, wherein said tray assembly includes a plurality of trays and wherein said control circuit displays a prompt on said display prompting a user to place a card on a certain tray of said tray assembly depending on said determined tray height.

A8. The card reader of claim A1, wherein said memory includes a lookup table correlating card type with operating parameters of said reader, wherein said control circuit reads data of said lookup table so that operating parameters of said reader vary depending upon a card type of said card.

A9. The card reader of claim A1, wherein said control circuit determines a card type of said card by displaying on said display a card type prompt prompting a user for card type information and by reading user input data input in response to said card type prompt.

A10. The card reader of claim A1, wherein said memory includes a lookup table correlating card type information with dataform information, wherein said control circuit deactivates certain decoding algorithms when processing a card based on said dataform information so that decoding algorithms activated by said control circuit when processing a card depend on a card type of said card.

A11. The card reader of claim A1, wherein said control circuit is adapted to:

display in said display a rightside up prompt prompting a user to place an identification card in said tray rightside up;

read a dataform of a topside of said card;

display on said display an upside down prompt prompting a user to place an identification card in said tray bottomside up;

read a dataform of a bottom side of said card;

compare decoded dataform data from a topside of a card to decoded dataform data from a bottomside of a card; and display on said display an INVALID CARD message if there is a mismatch of topside and bottomside data.

A12. The card reader of claim A9, wherein a dataform of a topside of said card is an OCR decodable dataform and wherein a dataform of a bottomside of said card is a symbol dataform.

A13. The card reader of claim A1, wherein said control circuit decodes said at least one dataform to determine a first set of image information, captures an image representation of a photograph of said card to determine a second set of image information, and displays on said display said first set of image information side by side said second set of image information.

A14. The card reader of claim 1, further comprising a mag stripe reader, wherein said control circuit is adapted to:

decode said dataform of said card to generate a first decoded message from a first card;

display on said display a prompt prompting a user to swipe a second card in said mag stripe reader;

read said mag stripe of said second card to generate a second decoded message from a second card; and compare said first decoded message to said second decoded message.

A15. The card reader of claim A1, wherein said card reader is in communication with an external database, and wherein said control circuit is adapted to:

decode a dataform of said card to generate a dataform message;

parse data of one certain field of said dataform message from remaining data from said dataform message;

access said external database;

call database data from said remote database using said parsed field data; and compare remaining data from said dataform message to said database data called from said remote database.

A16. The card reader of claim 13, wherein said parsed field data parsed from said dataform message is name field data.

A17. The card reader of claim A13, wherein said remote database is stored on a server of the internet.

A18. The reader of claim A1, wherein said reader is mobile and hand-held, wherein said housing comprises a front and a top, wherein said imaging axis extends from a front of said reader, wherein said tray assembly extends from a front of said housing, and wherein said control panel and display are disposed in top of said housing.

A19. The reader of claim A1, wherein said control circuit is adapted to display messages on said display that vary depending upon a level of degradation of said card.

A20. The reader of claim A1, wherein said control circuit is adapted to generate an error correction value when reading a card and wherein said control circuit displays a message in said display that varies depending upon said error correction value.

While the present invention has been explained with reference to the structure disclosed herein, it is not confined to the details set forth and this invention is intended to cover any modifications and changes as may come within the scope of the following claims:

The invention claimed is:

1. A card reader for processing a card having encoded thereon, in decodable form, information identifying a card holder of said card, said card reader comprising:

(a) a housing;

(b) a display disposed on said housing;

(c) a control circuit;

(d) a memory in communication with said control circuit; and (e) a card reading unit incorporated in said housing reading said information of said card that encodes information identifying a card holder of said card, said card reading unit being coupled to said control circuit, (f) wherein said card reader is configured to sense a level of degradation of said card, and (g) wherein said card reader is further configured to display indicia on said display in a manner that varies depending upon a determined level of degradation of said card.

2. The card reader of claim 1, wherein said card reading unit includes a bar code reader.

3. The card reader of claim 1, wherein said card reading unit includes an imaging assembly.

4. The card reader of claim 1, wherein said card reader includes a tray for holding said card.

5. The card reader of claim 1, wherein said memory includes a lookup table correlating card type with operating parameters of said reader, wherein said control circuit reads data of said lookup table so that operating parameters of said reader vary depending upon card type of said card.

6. The card reader of claim 1, wherein said card reading unit is provided by an imaging assembly, and wherein said card reader is configured to sense a level of degradation of said card by processing of image data.

7. The card reader of claim 1, wherein said card reading unit is provided by a bar code reader, wherein said card reader is configured to determine a level of degradation of said card by determining a level of error correction of a bar code symbol.

8. The card reader of claim 1, wherein said card reader includes a slot for receiving a card.

9. The card reader of claim 1, wherein said housing is a hand held housing.

10. The card reader of claim 1, wherein said control circuit and said memory are disposed within said housing.

11. The card reader of claim 1, wherein said card reader is configured to send information indicating said level of level of degradation to a remote processor system.

12. The card reader of claim 1, wherein said housing has at least a bottom and a side, and wherein said card reader further comprises a control panel disposed on said housing;
a tray assembly mounted to said housing, said tray assembly having a tray for receiving an identification card and wherein said card reader includes:
an imaging assembly in communication with said control circuit having an imaging axis passing through said tray.

13. The card reader of claim 12, wherein said housing includes a hole, and wherein said at least one tray opposes said hole, wherein said imaging axis further passes through said hole, and wherein an object detection symbol is disposed on said at least one tray, wherein said tray is mounted at an angle of at least about 10 degrees relative to a plate perpendicular to said imaging axis so that specular reflections are reduced.

14. The card reader of claim 12, wherein said tray assembly includes a plurality of trays, wherein said at least one tray is adapted to be of adjustable height, and wherein said control circuit displays a prompt on said display prompting a user to place a card on a certain tray of said tray assembly depending on said determined tray height.

15. The card reader of claim 12, wherein said memory includes a lookup table that correlates card type with tray height, and wherein said control circuit determines a card type of said card and reads data from said lookup table to determine a tray height for said card based on said card type, wherein said memory includes a lookup table correlating card type with operating parameters of said reader, wherein said control circuit reads data of said lookup table so that operating parameters of said reader vary depending upon a card type of said card.

16. The card reader of claim 12, wherein said memory includes a lookup table correlating card type information with dataform information, wherein said control circuit deactivates certain decoding algorithms when processing a card based on said dataform information so that decoding algorithms activated by said control circuit when processing a card depends on a card type of said card.

17. The card reader of claim 12, wherein said control circuit determines a card type of said card by displaying on said display a card type prompt prompting a user for card type information and by reading user input data input in response to said card type prompt.

18. The card reader of claim 12, wherein said control circuit is adapted to:
display in said display a right-side up prompt prompting a user to place an identification card in said tray right-side up;
read a dataform of a topside of said card;
display on said display an upside down prompt prompting a user to place an identification card in said tray bottom-side up;
read a dataform of a bottom-side of said card;
compare decoded dataform data from a topside of a card to decoded dataform data from a bottom-side of a card; and
display on said display an INVALID CARD message if there is a mismatch of topside and bottom-side data.

19. The card reader of claim 12, wherein said car reader is configured to read dataform of said card where a dataform of a topside of said card is an OCR decodable dataform and wherein a dataform of a bottom-side of said card is a symbol dataform.

20. The card reader of claim 12, wherein said control circuit decodes said at least one dataform to determine a first set of image information, captures an image representation of a photograph of said card to determine a second set of image information, and displays on said display said first set of image information side by side said second set of image information.

21. The card reader of claim 12, further comprising a mag stripe reader, wherein said control circuit is adapted to:
decode said dataform of said card to generate a first decoded message from a first card;
display on said display a prompt prompting a user to swipe a second card in said mag stripe reader;
read said mag stripe of said second card to generate a second decoded message from a second card; and
compare said first decoded message to said second decoded message.

22. The card reader of claim 12, wherein said card reader is in communication with an external database stored on an Internet server, and wherein said control circuit is adapted to:
decode a dataform of said card to generate a dataform message;
parse data of one certain field of said dataform message from remaining data from said dataform message wherein said parsed field data parsed from said dataform message is name field data;
access said external database;
call database data from said remote database using said parsed field data; and compare remaining data from said dataform message to said database data called from said remote database.

23. The reader of claim 12, wherein said reader is mobile and hand-held, wherein said housing comprises a front and a top, wherein said imaging axis extends from a front of said reader, wherein said tray assembly extends from a front of said housing, and wherein said control panel and display are disposed in said top of said housing.

24. A method comprising the steps of:
(a) providing a card reader capable of detecting a card degradation status of a card that has a corresponding card holder;
(b) detecting card degradation status of said card using said card reader capable of detecting card degradation status;
(c) communicating said detected card degradation status detected at step (b) to a remote processor system; and
(d) sending a notice or a new card to said card holder if data of said remote processor system indicates that a card degradation status of said card has exceeded a predetermined level.

25. The method of claim 24, wherein said card carries a bar code symbol.

26. The method of claim 24, wherein said card is a driver's license.

27. The method of claim 24, wherein said detecting step (b) includes the step of processing an image representation.

28. The method of claim 24, wherein said providing step includes the step of providing a card reader having an RF tag reader.

29. The method of claim 24, wherein said providing step includes the step of providing a hand held reader having a display.

30. A card reader system including a card reader for processing a card having encoded thereon, in decodable form, information identifying a card holder of said card, said card reader system comprising:
(a) a card reader including
a housing;
a display disposed on said housing;
a control circuit;
a memory in communication with said control circuit; and
a card reading unit incorporated in said housing reading said information of said card that encodes information identifying a card holder of said card, said card reading unit being coupled to said control circuit,
wherein said card reader is configured to sense a level of degradation of said card and to send information indicating a level of degradation of a card to a storage location; and
(b) a remote processor system
wherein said remote processor system is configured so that said remote processor system, responsively to processing of said information sent to said storage location issues a communication resulting in a notice or a new card being sent to a card holder if data of said remote processor system indicates that a card degradation status of said card has exceeded a predetermined level.

31. The card reader system of claim 30, wherein said card reading unit includes a bar code reader.

32. The card reader system of claim 30, wherein said card reading unit includes an imaging assembly.

33. The card reader system of claim 30, wherein said card reading unit is provided by an imaging assembly, and wherein said card reader is configured to sense a level of degradation of said card by processing of image data.

34. The card reader system of claim 30, wherein said card reading unit is provided by a bar code reader, wherein said card reader is configured to determine a level of degradation of said card by determining a level of error correction of a bar code symbol.

35. The card reader system of claim 30, wherein said card reader includes a slot for receiving a card.

36. The card reader system of claim 30, wherein said housing is a hand held housing.

37. The card reader system of claim 30, wherein said control circuit and said memory are disposed within said housing.

38. The card reader system of claim 30, wherein said storage location is a remote processor system.

39. A method comprising the steps of:
(a) providing a card reader capable of detecting a card degradation status of a card that has a corresponding card holder;
(b) detecting card degradation status of said card using said card reader capable of detecting card degradation status;
(c) communicating said detected card degradation status detected at step (b) to a remotely located database;
(d) processing data of said database; and
(e) issuing a communication resulting in a notice or a new card being sent to said card holder responsively to said processing.

40. The method of claim 39, wherein said processing of step (d) includes determining whether said card degradation status has exceeded a predetermined level.

41. The method of claim 39, wherein said database includes card holder identifiers correlated with card degradation status for a plurality of card holders.

42. The method of claim 39, wherein said card carries a bar code symbol.

43. The method of claim 39, wherein said card is a driver's license.

44. The method of claim 39, wherein said detecting step (b) includes the step of processing an image representation.

45. The method of claim 39, wherein said providing step includes the step of providing a card reader having an RF tag reader.

46. The method of claim 39, wherein said providing step includes the step of providing a hand held reader having a display.

47. A card reader system having a card reader for processing a card having encoded thereon, in decodable form, information identifying a card holder of said card, said card reader system comprising:
(a) a card reader including
a housing;
a display disposed on said housing;
a control circuit;
a memory in communication with said control circuit; and
a card reading unit incorporated in said housing reading said information of said card that encodes information identifying a card holder of said card, said card reading unit being coupled to said control circuit;
wherein said card reader is configured to sense a level of degradation of said card and to send information indicating a level of degradation of a card to a database; and (b) a remote processor system
   wherein said remote processor system is configured to process data of said database and responsively to said processing send a communication resulting in a notice or a new card being sent to said card holder.

48. The card reader system of claim 47, wherein said processing includes determining whether said card degradation status has exceeded a predetermined level.

49. The card reader system of claim 47, wherein said database includes card holder identifiers correlated with card degradation status for a plurality of card holders.

50. The card reader system of claim 47, wherein said card reader is hand held.

51. The card reader system of claim 47, wherein said card reading unit includes a bar code reader.

52. The card reader system of claim 47, wherein said card reading unit includes an imaging assembly.

53. The card reader system of claim 47, wherein said card reading unit is provided by an imaging assembly, and wherein said card reader is configured to sense a level of degradation of said card by processing of image data.

54. The card reader system of claim 47, wherein said card reader is configured to sense a level of degradation of said card conditionally on the condition that said card reader encounters difficulty in reading said card.

55. The card reader system of claim 47, wherein said card reader is configured to sense a level of degradation of said card responsively to a control input by an operator of said card reader.

56. The card reader system of claim 47, wherein said card reading unit is provided by a bar code reader, wherein said card reader is configured to determine a level of degradation of said card by determining a level of error correction of a bar code symbol.

57. The card reader system of claim 47, wherein said card reader includes a slot for receiving a card.

58. The card reader system of claim 47, wherein said housing is a hand held housing.

59. The card reader system of claim 47, wherein said control circuit and said memory are disposed within said housing.

60. The card reader system of claim 47, wherein said card reader utilizes said card reader unit for said sensing of said level of degradation of said card.

61. The card reader system of claim 47, wherein said database is stored on a remote processor system.

62. A card reader system having a card reader for processing a card having encoded thereon, in decodable form, information identifying a card holder of said card, said card reader system comprising:
   (a) a card reader including
      a housing;
      a display disposed on said housing;
      a control circuit;
      a memory in communication with said control circuit; and
      a card reading unit incorporated in said housing reading said information of said card that encodes information identifying a card holder of said card, said card reading unit being coupled to said control circuit;
      wherein said card reader is configured to send information indicating a level of degradation of a card to a storage location; and
   (b) a remote processor system
      wherein said remote processor system is configured to process said information sent to said storage location and responsively to said processing send a communication resulting in a notice or a new card being sent to a card holder.

63. The card reader system of claim 62, wherein said processing includes determining whether said card degradation status has exceeded a predetermined level.

64. The card reader system of claim 62, wherein said database includes card holder identifiers correlated with card degradation status for a plurality of card holders.

65. The card reader system of claim 62, wherein said card reader is configured to send said information indicating a level of degradation of said card conditionally on the condition that said card reader encounters difficult in reading said card.

66. The card reader system of claim 62, wherein said card reader is configured to said information indicating a level of degradation of said card responsively to a control input into said card reader.

67. The card reader system of claim 62, wherein said card reader is configured to send said information indicating a level of degradation of said card responsively to a control input by an operator of said card reader.

68. The card reader system of claim 62, wherein said card reading unit includes a bar code reader.

69. The card reader system of claim 62, wherein said card reading unit includes an imaging assembly.

70. The card reader system of claim 62, wherein said card reader is configured to sense a level of degradation of said card.

71. The card reader system of claim 62, wherein said card reading unit is provided by an imaging assembly, and wherein said card reader is configured to sense a level of degradation of said card by processing of image data.

72. The card reader system of claim 62, wherein said card reading unit is provided by a bar code reader, wherein said card reader is configured to determine a level of degradation of said card by determining a level of error correction of a bar code symbol.

73. The card reader system of claim 62, wherein said card reader includes a slot for receiving a card.

74. The card reader system of claim 62, wherein said housing is a hand held housing.

75. The card reader system of claim 62, wherein said control circuit and said memory are disposed within said housing.

76. The card reader system of claim 62, wherein said card reader utilizes said card reader unit for said sensing of said level of degradation of said card.

77. The card reader system of claim 62, wherein said storage location is a remote processor system.

* * * * *